United States Patent
Peeters et al.

(10) Patent No.: US 10,345,803 B2
(45) Date of Patent: Jul. 9, 2019

(54) MULTI-PART NAVIGATION PROCESS BY AN UNMANNED AERIAL VEHICLE FOR NAVIGATION

(71) Applicant: Wing Aviation LLC, Mountain View, CA (US)

(72) Inventors: Eric Peeters, Mountain View, CA (US);
Eric Teller, Palo Alto, CA (US);
William Graham Patrick, San Francisco, CA (US)

(73) Assignee: Wing Aviation LLC, Mountain View, CA (US)

( * ) Notice: Subject to any disclaimer, the term of this patent is extended or adjusted under 35 U.S.C. 154(b) by 0 days.

(21) Appl. No.: 15/785,212

(22) Filed: Oct. 16, 2017

(65) Prior Publication Data
US 2018/0307223 A1   Oct. 25, 2018

Related U.S. Application Data

(63) Continuation of application No. 15/082,205, filed on Mar. 28, 2016, now Pat. No. 9,823,654, which is a
(Continued)

(51) Int. Cl.
*G05D 1/00* (2006.01)
*B64C 19/00* (2006.01)
(Continued)

(52) U.S. Cl.
CPC .............. *G05D 1/00* (2013.01); *B64C 19/00* (2013.01); *B64C 39/024* (2013.01); *G01S 5/02* (2013.01);
(Continued)

(58) Field of Classification Search
CPC .......... G05D 1/00; G05D 1/12; B64C 39/024; B64C 19/00; B64C 2201/145;
(Continued)

(56) References Cited

U.S. PATENT DOCUMENTS

| 6,056,237 A | 5/2000 | Woodland |
| 6,567,044 B2 | 5/2003 | Carroll |

(Continued)

OTHER PUBLICATIONS

Bone et al., "Unmanned Aerial Vehicles: Background and Issues for Congress," Report for Congress, Congressional Research Science, The Library of Congress, Apr. 25, 2003, 53 pages.
(Continued)

*Primary Examiner* — Yuen Wong
(74) *Attorney, Agent, or Firm* — McDonnell Boehnen Hulbert & Berghoff LLP

(57) ABSTRACT

Embodiments described herein may relate to an unmanned aerial vehicle (UAV) navigating to a target in order to provide medical support. An illustrative method involves a UAV (a) determining an approximate target location associated with a target, (b) using a first navigation process to navigate the UAV to the approximate target location, where the first navigation process generates flight-control signals based on the approximate target location, (c) making a determination that the UAV is located at the approximate target location, and (d) in response to the determination that the UAV is located at the approximate target location, using a second navigation process to navigate the UAV to the target, wherein the second navigation process generates flight-control signals based on real-time localization of the target.

20 Claims, 9 Drawing Sheets

Related U.S. Application Data continuation of application No. 14/562,324, filed on Dec. 5, 2014, now Pat. No. 9,436,181, which is a continuation of application No. 13/730,317, filed on Dec. 28, 2012, now Pat. No. 8,930,044.

(51) Int. Cl.

| | | |
|---|---|---|
| *B64C 39/02* | (2006.01) | |
| *G01S 5/02* | (2010.01) | |
| *G05D 1/12* | (2006.01) | |
| *G08G 5/00* | (2006.01) | |
| *G01S 13/93* | (2006.01) | |
| *G01S 13/94* | (2006.01) | |
| *G01S 15/93* | (2006.01) | |
| *G01S 17/93* | (2006.01) | |
| *G01S 13/88* | (2006.01) | |
| *G01S 5/00* | (2006.01) | |

(52) U.S. Cl.
CPC .............. *G05D 1/12* (2013.01); *G08G 5/0069* (2013.01); *B64C 2201/12* (2013.01); *B64C 2201/14* (2013.01); *B64C 2201/145* (2013.01); *B64C 2201/146* (2013.01); *G01S 5/00* (2013.01); *G01S 13/882* (2013.01); *G01S 13/9303* (2013.01); *G01S 13/94* (2013.01); *G01S 15/93* (2013.01); *G01S 17/933* (2013.01)

(58) Field of Classification Search
CPC .......... B64C 2201/12; B64C 2201/146; B64C 2201/14; G08G 5/0069; G01S 5/02; G01S 5/00; G01S 15/93; G01S 13/94; G01S 17/933; G01S 13/882; G01S 13/9303
See application file for complete search history.

(56) References Cited

U.S. PATENT DOCUMENTS

| | | | |
|---|---|---|---|
| 6,817,573 B2 | 11/2004 | Harrison et al. | |
| 6,965,816 B2 | 11/2005 | Walker | |
| 7,574,193 B2 | 8/2009 | Hulkkonen et al. | |
| 7,813,888 B2 | 10/2010 | Vian et al. | |
| 7,877,785 B2 | 1/2011 | Selignan | |
| 8,028,952 B2 | 10/2011 | Umes, Sr. | |
| 9,051,043 B1 | 6/2015 | Peeters et al. | |
| 2007/0049251 A1 | 3/2007 | Mock et al. | |
| 2007/0221782 A1 | 9/2007 | Cerchie et al. | |
| 2008/0085732 A1 | 4/2008 | Mizuide et al. | |
| 2008/0139899 A1* | 6/2008 | Student et al. | 600/301 |
| 2010/0084513 A1 | 4/2010 | Gariepy et al. | |
| 2010/0198514 A1* | 8/2010 | Miralles | 701/302 |
| 2010/0256839 A1 | 10/2010 | Fitzpatrick | |
| 2010/0280699 A1 | 11/2010 | Bageshwar et al. | |
| 2011/0084162 A1 | 4/2011 | Goossen et al. | |
| 2011/0128372 A1 | 6/2011 | Malecki et al. | |
| 2011/0130606 A1 | 6/2011 | Daniel et al. | |
| 2011/0130636 A1* | 6/2011 | Daniel et al. | 600/301 |
| 2011/0198438 A1 | 8/2011 | Colting | |
| 2011/0267241 A1 | 11/2011 | Grimm et al. | |
| 2011/0281679 A1 | 11/2011 | Larrabee et al. | |
| 2011/0315806 A1 | 12/2011 | Piasecki et al. | |
| 2012/0080556 A1 | 4/2012 | Root, Jr. | |
| 2012/0152654 A1 | 6/2012 | Marcus | |
| 2012/0248259 A1 | 10/2012 | Page et al. | |

OTHER PUBLICATIONS

Lum et al., "Telesurgery Via Unmanned Aerial Vehicle (UAV) with a Field Deployable Surgical Robot," Medicine Meets Virtual Reality, Feb. 15, 2007, p. 313-315, Long Beach, California.

Nguyen et al., "Situation Identification by Unmanned Aerial Vechicle," Institute of Mathematics, 2001, pp. 49-56, Warsaw University.

Office Action for U.S. Appl. No. 14/705,879 dated Jun. 24, 2015, 45 pages.

\* cited by examiner

MULTI-PART NAVIGATION PROCESS BY AN UNMANNED AERIAL VEHICLE FOR NAVIGATION

CROSS REFERENCE TO RELATED APPLICATIONS

This application is a continuation of co-pending U.S. patent application Ser. No. 15/082,205, filed Mar. 28, 2016, which is a continuation of U.S. patent application Ser. No. 14/562,324, filed Dec. 5, 2014, which is a continuation of U.S. patent application Ser. No. 13/730,317, filed Dec. 28, 2012, now pending, the contents of all of which are incorporated by reference herein in their entirety and for all purposes.

BACKGROUND

Unless otherwise indicated herein, the materials described in this section are not prior art to the claims in this application and are not admitted to be prior art by inclusion in this section.

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while performing another task such as operating a mechanical system for picking up objects via remote control.

Various types of unmanned vehicles exist for various different environments. For example, unmanned vehicles exist for operation in the air, on the ground, underwater, and in space. Unmanned vehicles also exist for hybrid operations in which multi-environment use is possible. Examples of hybrid unmanned vehicles include an amphibious craft that is capable of operation on land as well as on water or a floatplane that is capable of landing on water as well as on land.

SUMMARY

In one aspect, an unmanned aerial vehicle (UAV) may include: (i) a navigation module that provides both a first and a second navigation process to generate flight-control signals for a UAV, wherein the first navigation process generates flight-control signals based on a predetermined location of a medical situation, and wherein the second navigation process generates flight-control signals based on a real-time localization process that locates the medical situation in real-time; and (ii) a control system configured to: (a) determine an approximate target location associated with the medical situation; (b) use the first navigation process to navigate the UAV from a remote location to the approximate target location of the medical situation; (c) make a determination that the UAV is located at the approximate target location of the medical situation; and (d) in response to the determination that the UAV is located at the approximate target location of the medical situation, switch to use of the second navigation process to locate, and navigate the UAV to, the medical situation.

In another aspect, an example method may involve: (a) determining, by a computing system of a UAV, an approximate target location associated with a medical situation; (b) the computing system using a first navigation process to navigate the UAV from a remote location to the approximate target location of the medical situation, wherein the first navigation process generates flight-control signals based on the approximate target location of a medical situation; (c) the computing system making a determination that the UAV is located at the approximate target location of the medical situation; and (d) in response to the determination that the UAV is located at the approximate target location of the medical situation, the computing system using a second navigation process to navigate the UAV to the medical situation, wherein the second navigation process generates flight-control signals based on real-time localization of the medical situation.

In a further aspect, a non-transitory computer readable medium may have stored therein instructions that are executable to cause a computing system to perform functions including: (a) determining an approximate target location associated with a medical situation; (b) using a first navigation process to navigate the UAV from a remote location to the approximate target location of the medical situation, wherein the first navigation process generates flight-control signals based on the approximate target location of a medical situation; (c) making a determination that the UAV is located at the approximate target location of the medical situation; and (d) in response to the determination that the UAV is located at the approximate target location of the medical situation, using a second navigation process to navigate the UAV to the medical situation, wherein the second navigation process generates flight-control signals based on real-time localization of the medical situation.

These as well as other aspects, advantages, and alternatives, will become apparent to those of ordinary skill in the art by reading the following detailed description, with reference where appropriate to the accompanying drawings.

DETAILED DESCRIPTION

Figure 1:
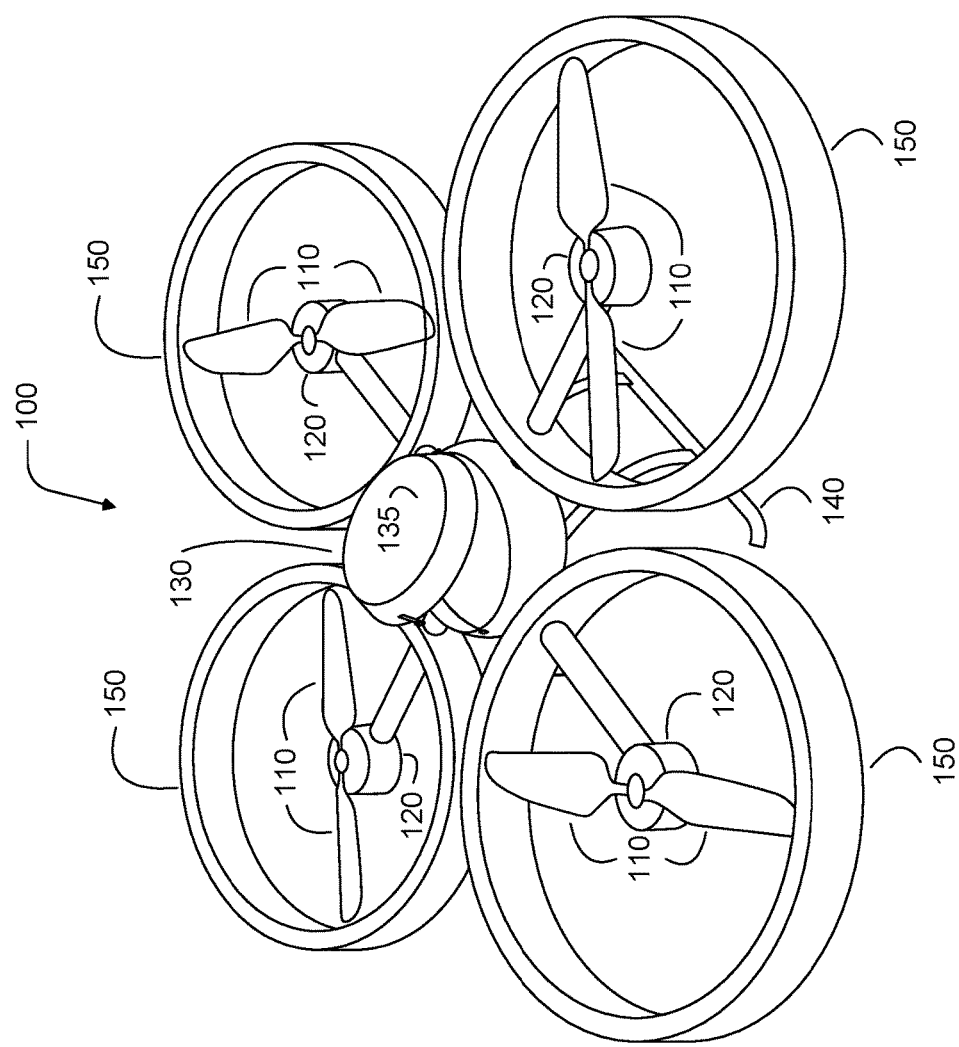
FIGS. 1, 2, 3A, and 3B are simplified illustrations of unmanned aerial vehicles, according to example embodiments.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems and methods can be arranged and combined in a wide variety of different configurations, all of which are contemplated herein.

I. Overview

Embodiments described herein may relate to and/or may be implemented in a system in which unmanned vehicles, and in particular, "unmanned aerial vehicles" (UAVs), are configured to provide medical support.

In an illustrative embodiment, a medical-support system may include a fleet of UAVs that are distributed throughout a geographic area, such as a city. The medical-support system may be configured for communications with remote devices, such as mobile phones, so that medical support can be requested by a person in need of such medical support (or by others on behalf of a person in need). The medical-support system can then dispatch the appropriate UAV or UAVs to the scene of the medical situation in order to provide medical support.

In particular, a medical-support system may include a fleet with a number of different types of UAVs, which are configured for different medical situations. For instance, some UAVs may be configured with items and/or functionality that are expected to be helpful in a cardiac-arrest situation, some UAVs may be configured to help a choking victim, some UAVs may be configured to help a trauma victim, and so on. As such, an illustrative medical-support system may be configured to identify or classify the particular type of medical situation that is occurring, to select the appropriate UAV from those that are available, and to dispatch the selected UAV to the scene of the medical situation.

In a further aspect, a medical-support system and/or individual UAVs may be configured to locate where a medical situation is occurring or has occurred, so that one or more UAVs can navigate to the scene of the medical situation. Specifically, a UAV may employ two navigation processes to navigate to the scene; a general navigation process that allows the UAV to navigate to a location or area near the scene, and a specific navigation process that is implemented once the UAV is near the scene and is based on on-the-fly localization of the medical situation.

In an example embodiment, a UAV may initially use a navigation process that is based on a predetermined flight path to fly to a predetermined approximate target location that is associated with a medical situation. For instance, when a bystander calls from their mobile phone to report a medical situation, the UAV or the medical-support system may determine the reported location of the mobile phone, and determine a number of waypoints between the UAV's location and the mobile phone's reported location. The UAV may then navigate, via the predetermined waypoints, to the reported location.

However, the reported location (which is the approximate target location, in this case), may not be exactly at the scene of the medical situation. For example, if a mobile phone reports its GPS coordinates, the reported GPS coordinates may, for various reasons, be somewhat inaccurate. To illustrate, consider a scenario where a person is having a heart attack in a stadium. In this scenario, GPS location information may only get a UAV so close to the person's actual location in the stadium; to the entrance of the stadium, for example. As such, navigation based on more accurate localization may be utilized to find and navigate to the specific location of the person within the stadium.

Accordingly, when the UAV reaches the predetermined approximate target location that is associated with a medical situation, the UAV may switch to a second navigation process, which may help the UAV to more accurately locate and navigate to the scene of the medical situation. For example, a UAV may use a process where the UAV locates a beacon that is emitted from another device at the scene (e.g., a mobile phone from which the medical situation was reported), and navigates to the source of the beacon. Additionally or alternatively, the UAV might build a map and/or obtain information about its environment from various types of sensor data (e.g., images and/or video of its environment), and use such information to locate and navigate to the scene of the medical situation.

In a further aspect, a UAV might switch to a second navigation process that involves the UAV actively and intelligently switching between multiple forms of navigation. For example, a UAV might attempt to search for a beacon from a device that is known or expected to be at the scene, and then use sensor data to obtain environmental information if it fails to locate the beacon. Further, the UAV might periodically repeat the process of searching for the beacon if it is unable to locate the medical situation from the environmental information it obtains. Yet further, if such autonomous localization of the medical situation is unsuccessful, the UAV might implement a fallback process that allows for full or partial control of the UAV by a remote operator, so that the remote operator can manually locate and/or navigate the UAV to the scene of the medical situation.

It should be understood that the above embodiments, and other embodiments described herein, are provided for explanatory purposes, and are not intended to be limiting.

Furthermore, the term "medical situation" as used herein should be understood to include any situation to which government or private entity, such as a police department, a fire department, and/or an emergency medical services (EMS) entity, might dispatch its personnel. Therefore, some medical situations may in fact be non-medical in nature. For example, an emergency situation to which a police car, fire truck, or ambulance might be dispatched may be considered a medical situation for purposes of this disclosure. Medical support may not be required at such emergency situations (e.g., when police are sent to the scene of a non-violent crime). Further, some non-emergency situations to which a police car, fire truck, ambulance, or the like might be dispatched may also be considered a medical situation for purposes of this disclosure. Thus, while exemplary embodiments may be described as being implemented to help provide medical support at the scene of a medical situation, those skilled in the art will understand that the UAVs, the functionality of such UAVs, and/or other aspects of the embodiments that are explicitly described herein can also apply in non-medical and/or non-emergency applications.

II. Illustrative Unmanned Vehicles

The term "unmanned aerial vehicle," as used in this disclosure, refers to any autonomous or semi-autonomous vehicle that is capable of performing some functions without a physically-present human pilot. Examples of flight-related functions may include, but are not limited to, sensing its environment or operating in the air without a need for input from an operator, among others.

A UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

FIG. 1 is a simplified illustration of a UAV, according to an example embodiment. In particular, FIG. 1 shows an example of a rotorcraft 100 that is commonly referred to as a multicopter. Multicopter 100 may also be referred to as a quadcopter, as it includes four rotors 110. It should be understood that example embodiments may involve rotorcraft with more or less rotors than multicopter 100. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 100 in greater detail, the four rotors 110 provide propulsion and maneuverability for the multicopter 100. More specifically, each rotor 110 includes blades that are attached to a motor 120. Configured as such the rotors may allow the multicopter 100 to take off and land vertically, to maneuver in any direction, and/or to hover. Furthermore, the pitch of the blades may be adjusted as a group and/or differentially, and may allow a multicopter 110 to perform three-dimensional aerial maneuvers such as an upside-down hover, a continuous tail-down "tic-toc," loops, loops with pirouettes, stall-turns with pirouette, knife-edge, immelmann, slapper, and traveling flips, among others. When the pitch of all blades is adjusted to perform such aerial maneuvering, this may be referred to as adjusting the "collective pitch" of the multicopter 100. Blade-pitch adjustment may be particularly useful for rotorcraft with substantial inertia in the rotors and/or drive train, but is not limited to such rotorcraft Additionally or alternatively, multicopter 100 may propel and maneuver itself adjust the rotation rate of the motors, collectively or differentially. This technique may be particularly useful for small electric rotorcraft with low inertia in the motors and/or rotor system, but is not limited to such rotorcraft.

Multicopter 100 also includes a central enclosure 130 with a hinged lid 135. The central enclosure may contain, e.g., control electronics such as an inertial measurement unit (IMU) and/or an electronic speed controller, batteries, other sensors, and/or a payload, among other possibilities.

The illustrative multicopter 100 also includes landing gear 140 to assist with controlled take-offs and landings. In other embodiments, multicopters and other types of UAVs without landing gear are also possible.

In a further aspect, multicopter 100 includes rotor protectors 150. Such rotor protectors 150 can serve multiple purposes, such as protecting the rotors 110 from damage if the multicopter 100 strays too close to an object, protecting the multicopter 100 structure from damage, and protecting nearby objects from being damaged by the rotors 110. It should be understood that in other embodiments, multicopters and other types of UAVs without rotor protectors are also possible. Further, rotor protectors of different shapes, sizes, and function are possible, without departing from the scope of the invention.

A multicopter 100 may control the direction and/or speed of its movement by controlling its pitch, roll, yaw, and/or altitude. To do so, multicopter 100 may increase or decrease the speeds at which the rotors 110 spin. For example, by maintaining a constant speed of three rotors 110 and decreasing the speed of a fourth rotor, the multicopter 100 can roll right, roll left, pitch forward, or pitch backward, depending upon which motor has its speed decreased. Specifically, the multicopter may roll in the direction of the motor with the decreased speed. As another example, increasing or decreasing the speed of all rotors 110 simultaneously can result in the multicopter 100 increasing or decreasing its altitude, respectively. As yet another example, increasing or decreasing the speed of rotors 110 that are turning in the same direction can result in the multicopter 100 performing a yaw-left or yaw-right movement. These are but a few examples of the different types of movement that can be accomplished by independently or collectively adjusting the RPM and/or the direction that rotors 110 are spinning.

Figure 2:
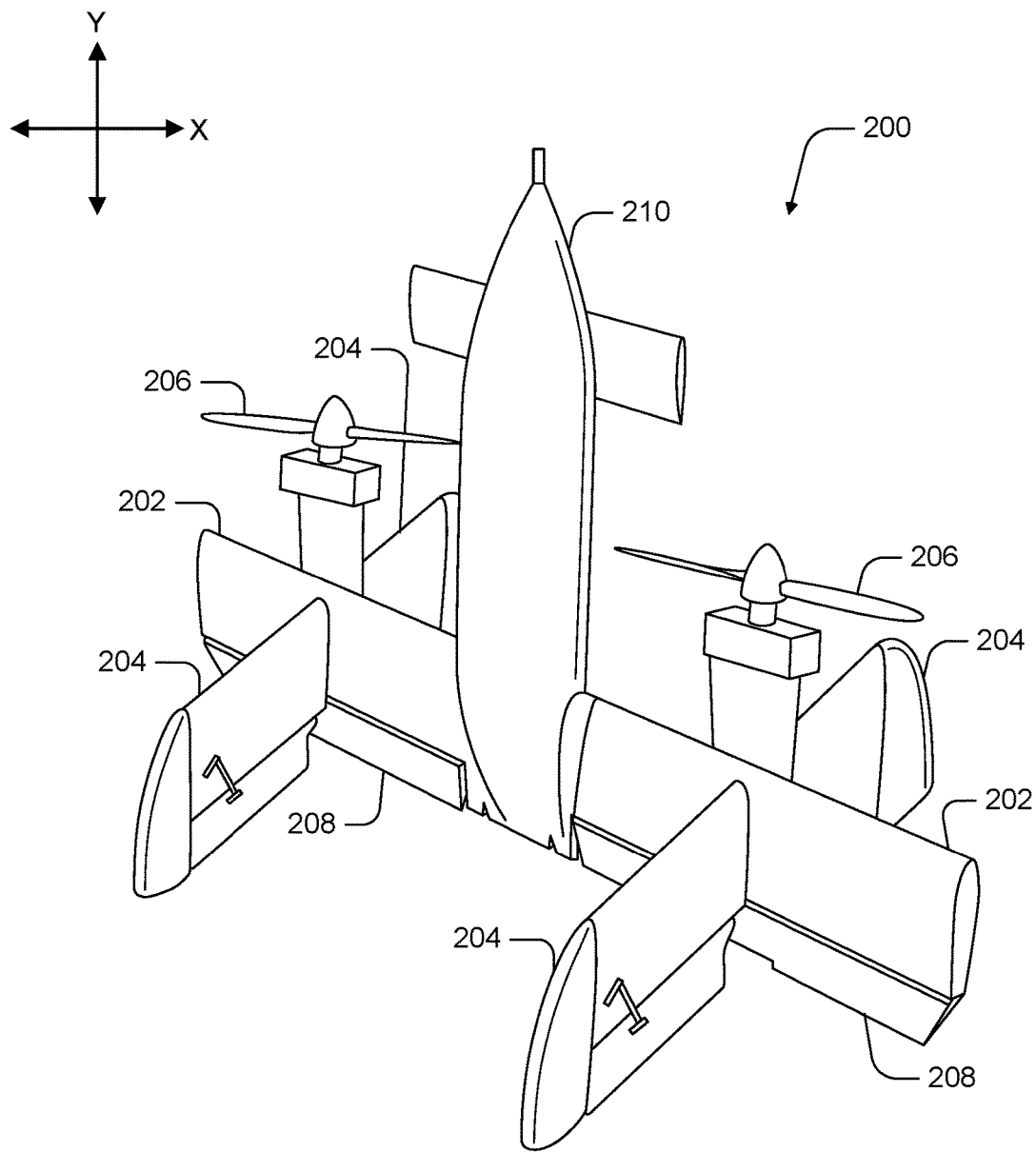

FIG. 2 is a simplified illustration of a UAV, according to an example embodiment. In particular, FIG. 2 shows an example of a tail-sitter UAV 200. In the illustrated example, the tail-sitter UAV 200 has fixed wings 202 to provide lift and allow the UAV to glide horizontally (e.g., along the x-axis, in a position that is approximately perpendicular to the position shown in FIG. 2). However, the fixed wings 202 also allow the tail-sitter UAV 200 take off and land vertically on its own.

For example, at a launch site, tail-sitter UAV 200 may be positioned vertically (as shown) with fins 204 and/or wings 202 resting on the ground and stabilizing the UAV in the vertical position. The tail-sitter UAV 200 may then take off by operating propellers 206 to generate the upward thrust (e.g., a thrust that is generally along the y-axis). Once at a suitable altitude, the tail-sitter UAV 200 may use its flaps 208 to reorient itself in a horizontal position, such that the fuselage 210 is closer to being aligned with the x-axis than the y-axis. Positioned horizontally, the propellers 206 may provide forward thrust so that the tail-sitter UAV 200 can fly in a similar manner as a typical airplane.

Variations on the illustrated tail-sitter UAV 200 are possible. For instance, tail-sitters UAVs with more or less propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 200 are also possible.

As noted above, some embodiments may involve other types of UAVs, in addition or in the alternative to multicopters. For instance, FIGS. 3A and 3B are simplified illustrations of other types of UAVs, according to example embodiments.

Figure 3A:
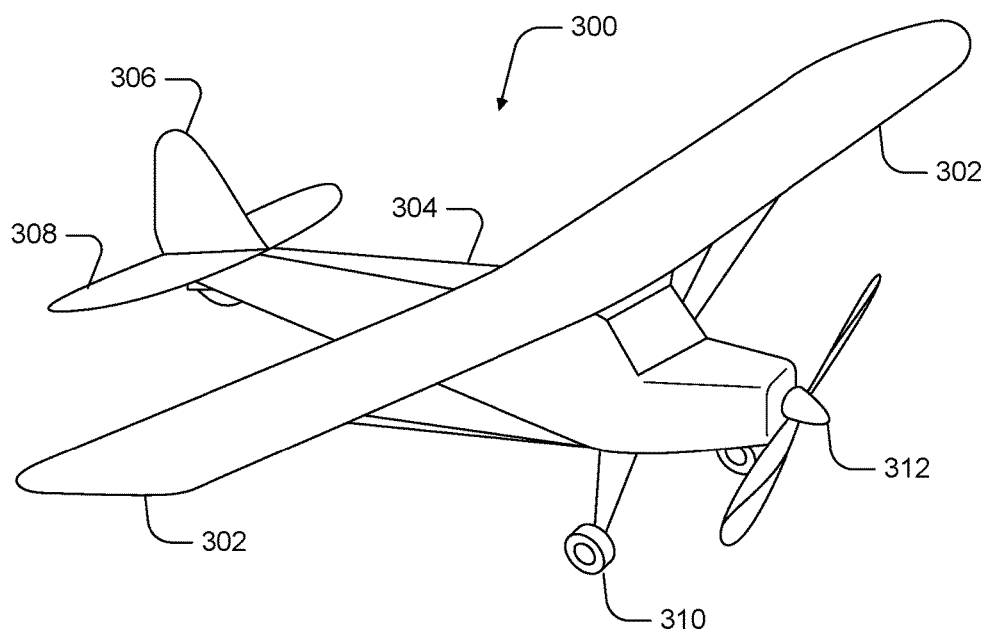

In particular, FIG. 3A shows an example of a fixed-wing aircraft 300, which may also be referred to as an airplane, an aeroplane, or simply a plane. A fixed-wing aircraft 300, as the name implies, has stationary wings 302 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 3A depicts some common structures used in a fixed-wing aircraft 300. In particular, fixed-wing aircraft 300 includes a fuselage 304, two horizontal wings 302 with an airfoil-shaped cross section to produce an aerodynamic force, a vertical stabilizer 306 (or fin) to stabilize the plane's yaw (turn left or right), a horizontal stabilizer 308 (also referred to as an elevator or tailplane) to stabilize pitch (tilt up or down), landing gear 310, and a propulsion unit 312, which can include a motor, shaft, and propeller.

Figure 3B:
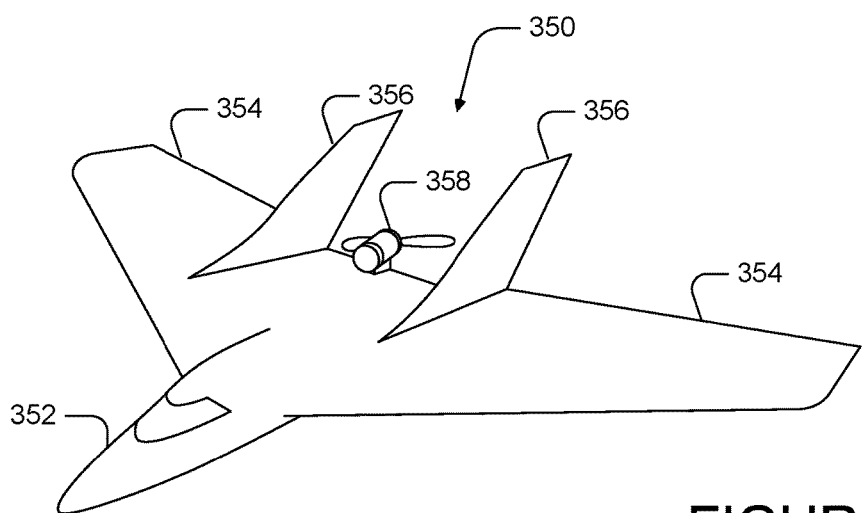

FIG. 3B shows an example of an aircraft 350 with a propeller in a pusher configuration. The term "pusher" refers to the fact that the propulsion unit 358 is mounted at the back of the aircraft and "pushes" the vehicle forward, in contrast to the propulsion unit being mounted at the front of the aircraft. Similar to the description provided for FIG. 3A, FIG. 3B depicts common structures used in the pusher plane: a fuselage 352, two horizontal wings 354, vertical stabilizers 356, and a propulsion unit 358, which can include a motor, shaft, and propeller.

UAVs can be launched in various ways, using various types of launch systems (which may also be referred to as deployment systems). A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle is exposed to risk from the quickly spinning propellers, a stationary or mobile launch station can be utilized. For instance, a launch system can include supports, angled and inclined rails, and a backstop. The aircraft begins the launch system stationary on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by thrusting the UAV into flight. A launch system of this type may launch a UAV quickly and/or may launch a UAV far towards the UAV's destination. Other types of launch systems may also be utilized.

In some cases, there may be no separate launch system for a UAV, as a UAV may be configured to launch itself. For example, a "tail sitter" UAV typically has fixed wings to provide lift and allow the UAV to glide, but also is configured to take off and land vertically on its own. Other examples of self-launching UAVs are also possible.

In a further aspect, various other types of unmanned vehicles may be utilized to provide remote medical support. Such vehicles may include, for example, unmanned ground vehicles (UGVs), unmanned space vehicles (USVs), and/or unmanned underwater vehicles (UUVs). A UGV may be a vehicle which is capable of sensing its own environment and navigating surface-based terrain without input from a driver. Examples of UGVs include watercraft, cars, trucks, buggies, motorcycles, treaded vehicles, and retrieval duck decoys, among others. A UUV is a vehicle that is capable of sensing its own environment and navigating underwater on its own, such as a submersible vehicle. Other types of unmanned vehicles are possible as well.

III. Illustrative Medical Support Systems with UAVs

Figure 4:
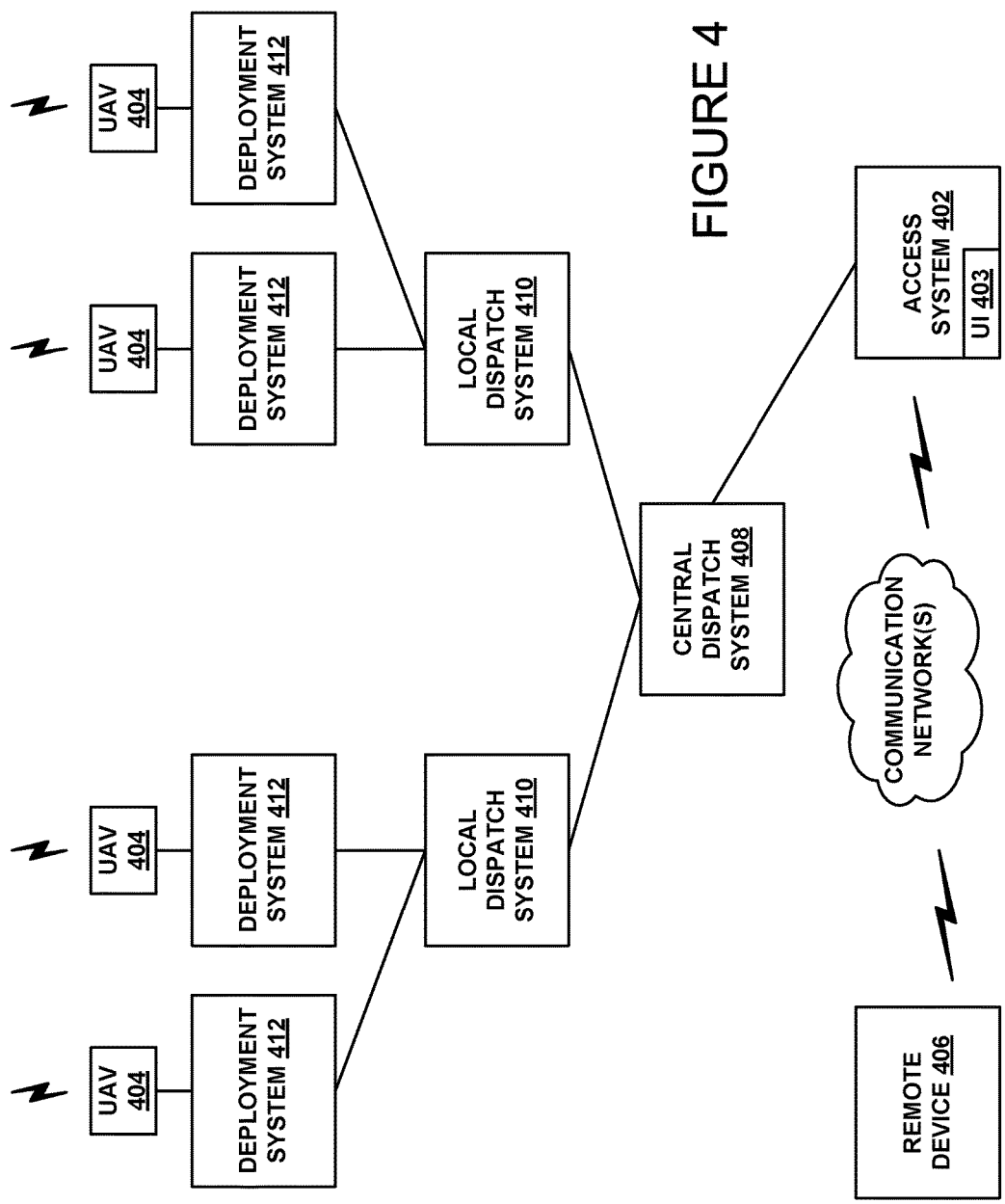
FIG. 4 is a simplified block diagram illustrating a medical support system, according to an example embodiment.

As noted above, UAVs may be deployed to provide remote medical support. FIG. 4 is a simplified block diagram illustrating a medical support system 400, according to an example embodiment.

In an illustrative medical-support system 400, an access system 402 may allow for interaction with, control of, and/or utilization of a network of medical-support UAVs 404. In some embodiments, an access system 402 may be a computing system that allows for human-controlled dispatch of UAVs 404. As such, the control system may include or otherwise provide a user interface (UI) 403 via which a user can access and/or control UAVs 404.

As a specific example, access system 402 could be a computing system at a police station or a fire station. Accordingly, a human operator at the police or fire station may receive an indication that a situation exists from a remote device 406 (e.g., a phone call, text message, etc.). The operator may then determine that medical support is appropriate and utilize access system 402 to dispatch one or more UAVs to provide the appropriate medical support. For example, the operator may use the UI 403 of access system 402 to request that a UAV be dispatched to the location of remote device 406 (or to another location indicated by the user of the remote device 406).

A UI 403 of an access system 402 may provide other functionality in addition to allowing for dispatch of UAVs 404. For example, UI 403 may allow an operator to specify certain details related to the medical situation to which the UAV is being dispatched. Examples of such details may include, but are not limited to: (a) general information related to the person or persons involved in the situation, such as age, height, weight, and so on, (b) medical information related to the person or persons involved in the situation, such as medical history, known allergies, and so on, (c) information related to the medical situation itself, such as symptoms exhibited by a person, details of events surrounding the situation (e.g., a car accident), and so on, and (d) desired specifications for the UAV to be dispatched, such as medical-support capabilities, wireless-communication capabilities, and so on.

Further, an access system 402 may provide for remote operation of a UAV. For instance, an access system 402 may allow an operator to control the flight of a UAV via UI 403. As a specific example, an operator may use an access system to dispatch a UAV 404 to the scene of a medical situation. The UAV 404 may then autonomously navigate to the general area where the medical situation is believed to exist (e.g., a stadium). At this point, the operator may use the access system 402 to take over control of the UAV 404, and navigate the UAV to the particular person in need of medical support (e.g., to the person's seat within the stadium). Other examples are also possible.

In an illustrative embodiment, UAVs 404 may take various forms. For example, each UAV 404 may be a UAV such as those illustrated in FIGS. 1, 2, 3A, and 3B. However, medical support system 400 may also utilize other types of UAVs without departing from the scope of the invention. In some implementations, all UAVs 404 may be of the same or a similar configuration. However, in other implementations, UAVs 404 may include a number of different types of UAVs. For instance, UAVs 404 may include a number of types of UAVs, with each type of UAV being configured for a different type or types of medical support.

A remote device 406 may take various forms. Generally, a remote device 406 may be any device via which a request for medical support can be made and/or via which a situation that may require or benefit from medical support can be reported. For instance, a remote device 406 may be a mobile phone, tablet computer, laptop computer, personal computer, or any network-connected computing device. Further, in some instances, remote device 406 may not be a computing device. As an example, a standard telephone, which allows for communication via plain old telephone service (POTS), may serve as a remote device 406.

Further, a remote device 406 may be configured to communicate with access system 402 via one or more types of communication network(s) 414. For example, a remote device 406 could communicate with access system 402 (or via a human operator of the access system) by placing a phone call over a POTS network, a cellular network, and/or a data network such as the Internet. Other types of networks may also be utilized.

As noted above, a remote device 406 may be configured to allow a user to request medical support. For example, a person may use their mobile phone, a POTS phone, or a VoIP phone, to place an emergency call (e.g., a 9-1-1 call) and request that medical support be provided at the scene of an accident. Further, note that a request for medical support need not be explicit. For instance, a person may place a 9-1-1 call to report an emergency situation. When the 9-1-1 operator receives such a call, the operator may evaluate the information that is provided and decide that medical support is appropriate. Accordingly, the operator may use an access system 402 to dispatch a UAV 404.

In a further aspect, a remote device 406 may be configured to determine and/or provide an indication of its own location. For example, remote device 406 may include a GPS system so that it can include GPS location information (e.g., GPS coordinates) in a communication to an access system 402 and/or to a dispatch system such as central dispatch system 408. As another example, a remote device 406 may use a technique that involves triangulation (e.g., between base stations in a cellular network) to determine its location. Alternatively, another system such as a cellular network may use a technique that involves triangulation to determine the location of a remote device 406, and then send a location message to the remote device 406 to inform the remote device of its location. Other location-determination techniques are also possible.

In an illustrative arrangement, central dispatch system 408 may be a server or group of servers, which is configured to receive dispatch messages requests and/or dispatch instructions from an access system 402. Such dispatch messages may request or instruct the central dispatch system 408 to coordinate the deployment of UAVs for remote medical support. A central dispatch system 408 may be further configured to route such requests or instructions to local dispatch systems 410. To provide such functionality, central dispatch system 408 may communicate with access system 402 via a data network, such as the Internet or a private network that is established for communications between access systems and automated dispatch systems.

In the illustrated configuration, central dispatch system 408 may be configured to coordinate the dispatch of UAVs 404 from a number of different local dispatch systems 410. As such, central dispatch system 408 may keep track of which UAVs 404 are located at which local dispatch systems 410, which UAVs 404 are currently available for deployment, and/or which medical situation or situations each of the UAVs 404 is configured for. Additionally or alternatively, each local dispatch system 410 may be configured to track which of its associated UAVs 404 are currently available for deployment and/or which medical situation or situations each of its associated UAVs is configured for.

In some embodiments, when central dispatch system 408 receives a request for medical support from an access system 402, central dispatch system 408 may select a specific UAV 404 to dispatch. The central dispatch system 408 may accordingly instruct the local dispatch system 410 that is associated with the selected UAV to dispatch the selected UAV. The local dispatch system 410 may then operate its associated deployment system 412 to launch the selected UAV.

As a specific example, central dispatch system 408 may receive a request for medical support that indicates a certain type of medical situation and a location where the situation is occurring. Take, for instance, a request for medical support at the home of a person who appears to have suffered from cardiac arrest. In this scenario, the central dispatch system 408 may evaluate the fleet of UAVs 404 to select the closest available UAV to the person's home that is configured to provide medical support when a heart attack has occurred. Alternatively, the central dispatch system 408 may select an available UAV that is within a certain distance from the person's home (which may or may not be the closest), and which is configured to provide medical support when cardiac arrest has occurred.

In other embodiments, a central dispatch system 408 may forward a request for medical support to a local dispatch system 410 that is near the location where the support is requested, and leave the selection of a particular UAV 404 to the local dispatch system 410. For instance, in a variation on the above example, central dispatch system 408 may forward a request for medical support at the home of a person who appears to have suffered from a heart attack to the local dispatch system 410 that is closest to, or within a certain distance from, the person's home. Upon receipt of the request, the local dispatch system 410 may then determine which of its associated UAVs is configured to provide medical support to a heart-attack victim, and deploy this UAV.

In an example configuration, a local dispatch system 410 may be implemented in a computing system at the same location as the deployment system or systems 412 that it controls. For example, in some embodiments, a local dispatch system 410 could be implemented by a computing system at a building, such as a fire station, where the deployment systems 412 and UAVs 404 that are associated with the particular local dispatch system 410 are also located. In other embodiments, a local dispatch system 410 could be implemented at a location that is remote to its associated deployment systems 412 and UAVs 404.

Numerous variations on and alternatives to the illustrated configuration of medical support system 400 are possible. For example, in some embodiments, a user of a remote device 406 could request medical support directly from a central dispatch system 408. To do so, an application may be implemented on a remote device 406 that allows the user to provide information regarding a medical situation, and generate and send a data message to request medical support. Such an application might also allow the user to request a particular type of medical support (e.g., by requesting that a UAV deliver a certain kind of medicine). In such an embodiment, central dispatch system 408 may include automated functionality to handle requests that are generated by such an application, evaluate such requests, and, if appropriate, coordinate with an appropriate local dispatch system 410 to deploy a UAV.

Further, in some implementations, some or all of the functionality that is attributed herein to central dispatch system 408, local dispatch system(s) 410, access system 402, and/or deployment system(s) 412 could be combined in a single system, implemented in a more complex system, and/or redistributed among central dispatch system 408, local dispatch system(s) 410, access system 402, and/or deployment system(s) 412 in various ways.

Yet further, while each local dispatch system 410 is shown as having two associated deployment systems, a given local dispatch system 410 may have more or less associated deployment systems. Similarly, while central dispatch system 408 is shown as being in communication with two local dispatch systems 410, a central dispatch system may be in communication with more or less local dispatch systems 410.

In a further aspect, a deployment system 412 may take various forms. In general, a deployment system may take the form of or include a system for physically launching a UAV 404. Further, a deployment system 412 may be configured to launch one particular UAV 404, or to launch multiple UAVs 404. A deployment system 412 may further be configured to provide additional functions, including for example, diagnostic-related functions such as verifying system functionality of the UAV, verifying functionality of devices that are housed within a UAV (e.g., such as a defibrillator, a mobile phone, or an HMD), and/or maintaining devices or other items that are housed in the UAV (e.g., by charging a defibrillator, mobile phone, or HMD, or by checking that medicine has not expired).

In some embodiments, the deployment systems 412 and their corresponding UAVs 404 (and possibly associated local dispatch systems 410) may be strategically distributed throughout an area such as a city. For example, deployment systems 412 may be located on the roofs of certain municipal buildings, such as fire stations, which can thus serve as the dispatch locations for UAVs 404. Fire stations may function well for UAV dispatch, as fire stations tend to be distributed well with respect to population density, their roofs tend to be flat, and the use of firehouse roofs as leased spaces for UAV dispatch could further the public good. However, deployment systems 412 (and possibly the local dispatch systems 410) may be distributed in other ways, depending upon the particular implementation.

In a further aspect, a medical-support system 400 may include or have access to a user-account database 414. The user-account database 414 may include data for a number of user-accounts, which are each associated with one or more person. For a given user-account, the user-account database 414 may include data related to the associated person or persons' medical history and/or may include other data related to the associated person or persons. Note that the medical-support system may only acquire, store, and utilize data related to a person with that person's explicit permission to do so.

Further, in some embodiments, a person may have to register for a user-account with the medical-support system 400 in order to use or be provided with medical support by the UAVs 404 of medical-support system 400. As such, the user-account database 414 may include authorization information for a given user-account (e.g., a user-name and password), and/or other information that may be used to authorize access to a user-account.

In some embodiments, a person may associate one or more of their devices with their user-account, such that they can be provided with access to the services of medical-support system 400. For example, when a person uses an associated mobile phone to, e.g., place a call to an operator of access system 402 or send a message requesting medical support to a dispatch system, the phone may be identified via a unique device identification number, and the call or message may then be attributed to the associated user-account. In addition or in the alternative to being an authorization mechanism, identifying the user-account may allow information such as the person's medical history to be used in responding to their request for medical support.

In a further aspect, the user-account database 414 may include data indicating a service level for each user. More specifically, a medical-support system 400 may provide service according to a number of different service levels, which correspond to different types of medical support. For example, a higher service level may: (a) provide access to additional types of UAVs, (b) provide medical support for additional medical situations, (c) provide access to improved support for a given medical situation, and/or (d) have priority as far as response time to requests for medical support, as compared to a lower service level. Other differences between a higher and lower service level are also possible.

In some embodiments, there may be no individual user accounts associated with a medical system; or, user accounts may exist but may not be used for purposes of determining whether a person should be provided medical support and/or for purposes of determining the quality of medical support that should be provided. For example, a medical support system may be implemented by a municipality or another public entity to provide medical support to citizens for free or at an equal cost. Other examples are also possible.

IV. Illustrative Components of a Medical-Support UAV

Figure 5:
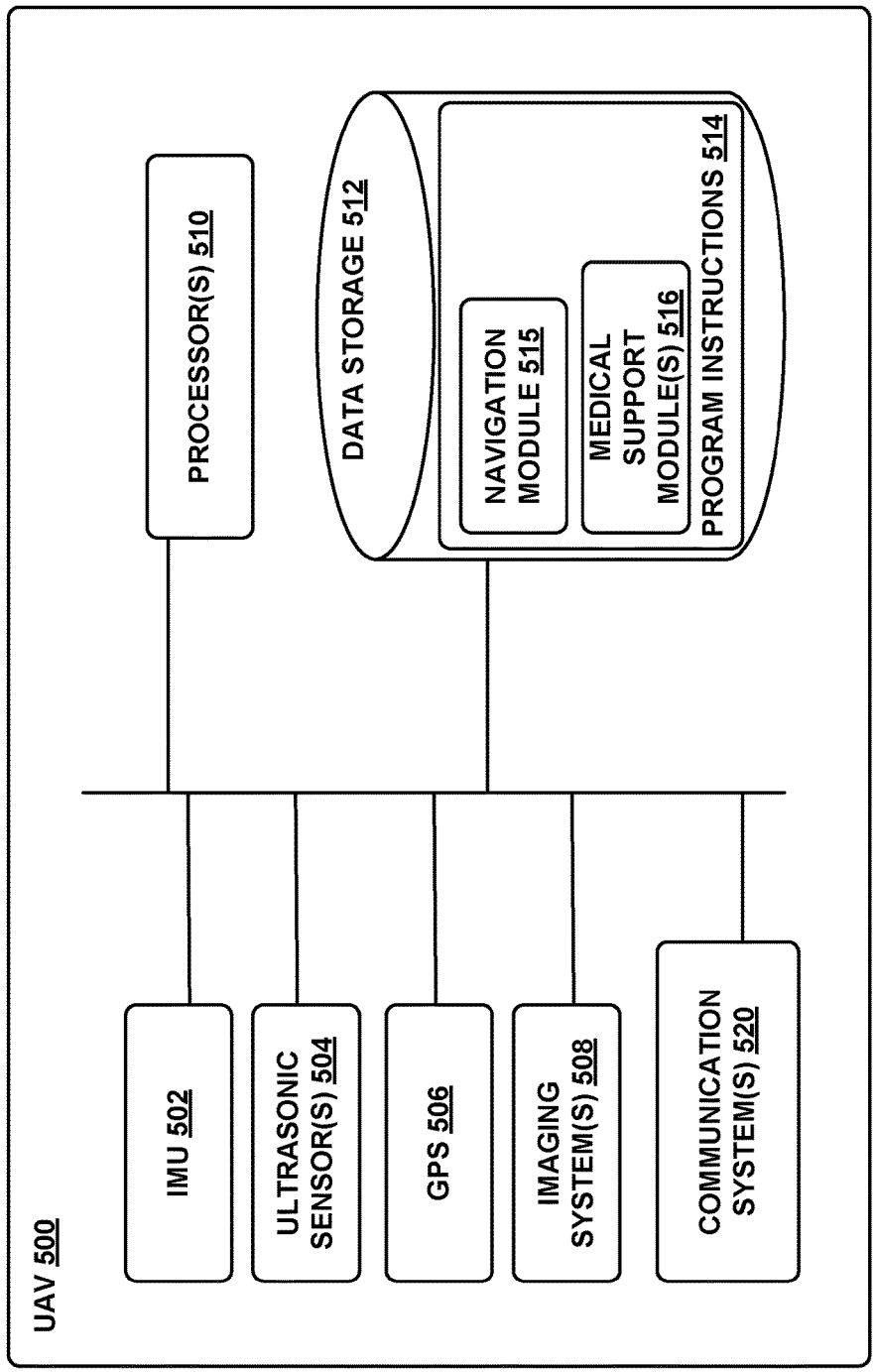
FIG. 5 is a simplified block diagram illustrating components of an unmanned aerial vehicle, according to an example embodiment.

FIG. 5 is a simplified block diagram illustrating components of a UAV 500, according to an example embodiment. UAV 500 may take the form of or be similar in form to one of the UAVs 100, 200, 300, and 350 shown in FIGS. 1, 2, 3A, and 3B. However, a UAV 500 may also take other forms.

UAV 500 may include various types of sensors, and may include a computing system configured to provide the functionality described herein. In the illustrated embodiment, the sensors of UAV 500 include an inertial measurement unit (IMU) 502, ultrasonic sensor(s) 504, GPS 506, imaging system(s) 508, among other possible sensors and sensing systems.

In the illustrated embodiment, UAV 500 also includes one or more processors 510. A processor 510 may be a general-purpose processor or a special purpose processor (e.g., digital signal processors, application specific integrated circuits, etc.). The one or more processors 510 can be configured to execute computer-readable program instructions 514 that are stored in the data storage 512 and are executable to provide the functionality of a UAV described herein.

The data storage 512 may include or take the form of one or more computer-readable storage media that can be read or accessed by at least one processor 510. The one or more computer-readable storage media can include volatile and/or non-volatile storage components, such as optical, magnetic, organic or other memory or disc storage, which can be integrated in whole or in part with at least one of the one or more processors 510. In some embodiments, the data storage 512 can be implemented using a single physical device (e.g., one optical, magnetic, organic or other memory or disc storage unit), while in other embodiments, the data storage 512 can be implemented using two or more physical devices.

As noted, the data storage 512 can include computer-readable program instructions 514 and perhaps additional data, such as diagnostic data of the UAV 500. As such, the data storage 514 may include program instructions to perform or facilitate some or all of the UAV functionality described herein. For instance, in the illustrated embodiment, program instructions 514 include a navigation module 515 and one or more medical-support modules 516.

A. Sensors

In an illustrative embodiment, IMU 502 may include both an accelerometer and a gyroscope, which may be used together to determine the orientation of the UAV 500. In particular, the accelerometer can measure the orientation of the vehicle with respect to earth, while the gyroscope measures the rate of rotation around an axis. IMUs are commercially available in low-cost, low-power packages. For instance, an IMU 502 may take the form of or include a miniaturized MicroElectroMechanical System (MEMS) or a NanoElectroMechanical System (NEMS). Other types of IMUs may also be utilized.

An IMU 502 may include other sensors, in addition to accelerometers and gyroscopes, which may help to better determine position and/or help to increase autonomy of the UAV 500. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 500, slight errors in measurement may compound over time and result in a more significant error. However, an example UAV 500 may be able mitigate or reduce such errors by using a magnetometer to measure direction. One example of a magnetometer is a low-power, digital 3-axis magnetometer, which can be used to realize an orientation independent electronic compass for accurate heading information. However, other types of magnetometers may be utilized as well.

UAV 500 may also include a pressure sensor or barometer, which can be used to determine the altitude of the UAV 500. Alternatively, other sensors, such as sonic altimeters or radar altimeters, can be used to provide an indication of altitude, which may help to improve the accuracy of and/or prevent drift of an IMU.

In a further aspect, UAV 500 may include one or more sensors that allow the UAV to sense objects in the environment. For instance, in the illustrated embodiment, UAV 500 includes ultrasonic sensor(s) 504. Ultrasonic sensor(s) 504 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

UAV 500 also includes a GPS receiver 506. The GPS receiver 506 may be configured to provide data that is typical of well-known GPS systems, such as the GPS coordinates of the UAV 500. Such GPS data may be utilized by the UAV 500 for various functions. For example, when a caller uses a mobile device to request medical support from a UAV, the mobile device may provide its GPS coordinates. As such, the UAV may use its GPS receiver 506 to help navigate to the caller's location, as indicated, at least in part, by the GPS coordinates provided by their mobile device. Other examples are also possible.

UAV 500 may also include one or more imaging system(s) 508. For example, one or more still and/or video cameras may be utilized by a UAV 500 to capture image data from the UAV's environment. As a specific example, charge-coupled device (CCD) cameras or complementary metal-oxide-semiconductor (CMOS) cameras can be used with unmanned vehicles. Such imaging sensor(s) 508 have numerous possible applications, such as obstacle avoidance, localization techniques, ground tracking for more accurate navigation (e,g., by applying optical flow techniques to images), video feedback, and/or image recognition and processing, among other possibilities.

In a further aspect, UAV 500 may use its one or more imaging system 508 to help in determining location. For example, UAV 500 may capture imagery of its environment and compare it to what it expects to see in its environment given current estimated position (e.g., its current GPS coordinates), and refine its estimate of its position based on this comparison.

In a further aspect, UAV 500 may include one or more microphones. Such microphones may be configured to capture sound from the UAVs environment.

B. Navigation and Location Determination

The navigation module 515 may provide functionality that allows the UAV 500 to, e.g., move about in its environment and reach a desired location. To do so, the navigation module 515 may control the altitude and/or direction of flight by controlling the mechanical features of the UAV that affect flight (e.g., rotors 110 of UAV 100).

In order to navigate the UAV 500 to a target location, a navigation module 515 may implement various navigation techniques, such as map-based navigation and localization-based navigation, for instance. With map-based navigation, the UAV 500 may be provided with a map of its environment, which may then be used to navigate to a particular location on the map. With localization-based navigation, the UAV 500 may be capable of navigating in an unknown environment using localization. Localization-based navigation may involve a UAV 500 building its own map of its environment and calculating its position within the map and/or the position of objects in the environment. For example, as a UAV 500 moves throughout its environment, the UAV 500 may continuously use localization to update its map of the environment. This continuous mapping process may be referred to as simultaneous localization and mapping (SLAM). Other navigation techniques may also be utilized.

In some embodiments, the navigation module 515 may navigate using a technique that relies on waypoints. In particular, waypoints are sets of coordinates that identify points in physical space. For instance, an air-navigation waypoint may be defined by a certain latitude, longitude, and altitude. Accordingly, navigation module 515 may cause UAV 500 to move from waypoint to waypoint, in order to ultimately travel to a final destination (e.g., a final waypoint in a sequence of waypoints).

In a further aspect, navigation module 515 and/or other components and systems of UAV 500 may be configured for "localization" to more precisely navigate to the scene of a medical situation. More specifically, it may be desirable in certain situations for a UAV to be close to the person in need of medical support (e.g., within reach of the person), so as to properly provide medical support to the person. To this end, a UAV may use a two-tiered approach in which it uses a more-general location-determination technique to navigate to a target location or area that is associated with the medical situation, and then use a more-refined location-determination technique to identify and/or navigate to the target location within the general area.

For example, a UAV 500 may navigate to the general area (i.e., an approximate target location) of a person in need using waypoints that are pre-determined based on GPS coordinates provided by a remote device at the scene of the medical situation. The UAV may then switch to mode in which it utilizes a localization process to locate and travel to a specific location of the person in need. For example, if a person is having a heart attack at a large stadium, a UAV 500 carrying a medical package may need to be within reach of the person or someone near the person so that the can take items from the package. However, a GPS signal may only get a UAV so far, e.g., to the stadium. Thus, the GPS coordinates may be considered an approximate target location for the medical situation. As such, a more precise location-determination technique may then be used to find the specific location of the person within the stadium. For example, a type of location-determination technique referred to as "localization" or "real-time localization," which uses real-time information gathered from the environment of the UAV to locate a target, may provide for more precise location determination.

Various types of location-determination techniques may be used to accomplish localization of a person once a UAV 500 has navigated to the general area of the person. For instance, a UAV 500 may be equipped with one or more sensory systems, such as, for example, imaging system(s) 508, a directional microphone array (not shown), ultrasonic sensors 504, infrared sensors (not shown), and/or other sensors, which may provide input that the navigation module 515 utilizes to navigate autonomously or semi-autonomously to the specific location of a person.

As another example, once the UAV 500 reaches the general area of the person, the UAV 500 may switch to a "fly-by-wire" mode where it is controlled, at least in part, by a remote operator, who can navigate the UAV 500 to the specific location of the person in need. To this end, sensory data from the UAV 500 may be sent to the remote operator to assist them in navigating the UAV to the specific location. For example, the UAV 500 may stream a video feed or a sequence of still images from the UAV's imaging system(s) 508. Other examples are possible.

As yet another example, the UAV 500 may include a module that is able to signal to a passer-by for assistance in either reaching the specific location or delivering its medical-support items to the medical situation; for example, by displaying a visual message in a graphic display, playing an audio message or tone through speakers, flashing a light, or performing a combination of such functions. Such visual or audio message might indicate that assistance is needed in delivering the UAV 500 to the person in need, and might provide information to assist the passer-by in delivering the UAV 500 to the person, such a description of the person, the person's name, and/or a description of the person's specific location, among other possibilities. This implementation can be useful in a scenario in which the UAV is unable to use sensory functions or another location-determination technique to determine the specific location of the person.

As an additional example, once a UAV 500 arrives at the general area of a person, the UAV may utilize a beacon from the remote device (e.g., the mobile phone of a person who called for medical support) to locate the person. Such a beacon may take various forms. As an example, consider the scenario where a remote device, such as the mobile phone of a person in need or a bystander, is able to send out directional signals (e.g., an RF signal, a light signal and/or an audio signal). In this scenario, the UAV may be configured to navigate by "sourcing" such directional signals—in other words, by determining where the signal is strongest and navigating accordingly. As another example, a mobile device can emit a frequency, either in the human range or outside the human range, and the UAV can listen for that frequency and navigate accordingly. As a related example, if the UAV is listening for spoken commands, then the UAV could utilize spoken statements, such as "Help! I'm over here!" to source the specific location of the person in need of medical assistance.

In an alternative arrangement, a navigation module may be implemented at a remote computing device, which communicates wirelessly with the UAV. The remote computing device may receive data indicating the operational state of the UAV, sensor data from the UAV that allows it to assess the environmental conditions being experienced by the UAV, and/or location information for the UAV. Provided with such information, the remote computing device may determine altitudinal and/or directional adjustments that should be made by the UAV and/or may determine how the UAV should adjust its mechanical features (e.g., rotors 110 of UAV 100) in order to effectuate such movements. The remote computing system may then communicate such adjustments to the UAV so it can move in the determined manner.

C. Communication Systems

In a further aspect, UAV 500 includes one or more communication systems 520. The communications systems 520 may include one or more wireless interfaces and/or one or more wireline interfaces, which allow UAV 500 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 500 may include communication systems 520 that allow for both short-range communication and long-range communication. For example, the UAV 500 may be configured for short-range communications using Bluetooth and for long-range communications under a CDMA protocol. In such an embodiment, the UAV 500 may be configured to function as a "hot spot;" or in other words, as a gateway or proxy between a remote support device and one or more data networks, such as cellular network and/or the Internet. Configured as such, the UAV 500 may facilitate data communications that the remote support device would otherwise be unable to perform by itself.

For example, UAV 500 may provide a WiFi connection to a remote device, and serve as a proxy or gateway to a cellular service provider's data network, which the UAV might connect to under an LTE or a 3G protocol, for instance. The UAV 500 could also serve as a proxy or gateway to a high-altitude balloon network, a satellite network, or a combination of these networks, among others, which a remote device might not be able to otherwise access.

D. Power Systems

In a further aspect, UAV 500 may include power system(s) 521. A power system 521 may include one or more batteries for providing power to the UAV 500. In one example, the one or more batteries may be rechargeable and each battery may be recharged via a wired connection between the battery and a power supply and/or via a wireless charging system, such as an inductive charging system that applies an external time-varying magnetic field to an internal battery.

E. Medical-Support Functionality

As noted above, UAV 500 may include one or more medical-support modules 516. The one or more medical-support modules 516 include software, firmware, and/or hardware that may help to provide or assist in the provision of the medical-support functionality described herein.

Configured as such, a UAV 500 may provide medical support in various ways. For instance, a UAV 500 may have stored information that can be provided to a person or persons at the target location, in order to assist the person or persons in providing medical care. For example, a UAV may include a video or audio file with instructions for providing medical support, which the UAV can play out to a person at the target location. As another example, a UAV may include an interactive program to assist a person at the target location in providing medical support. For instance, a UAV may include an application that analyzes the person's speech to detect questions related to the medical situation and/or that provides a text-based interface via which the person can ask such questions, and then determines and provides answers to such questions.

In some embodiments, a UAV 500 may facilitate communication between a layperson and/or medical personnel at the scene and medical personnel at a remote location. As an example, a medical support module 516 may provide a user interface via which a person at the scene can use a communication system 520 of the UAV to communicate with an emergency medical technician at a remote location. As another example, the UAV 500 can unlock certain capabilities of a remote device, such as a mobile phone, which is near the UAV at the scene of a medical situation. Such capabilities may be inaccessible to a user of the remote device, unless the remote device is within a certain distance from the UAV such that the UAV can unlock the capabilities. For example, a UAV may send the remote device a security key that allows the remote device to establish a secure connection to communicate with medical personnel at a remote location. Other examples are also possible.

Further, in order to provide medical support at a remote location, a UAV 500 may be configured to transport items to the scene of a medical situation. Such items may aid in diagnosing and/or treating a person who needs medical assistance, or may serve other purposes. Such items may include, as examples: (a) medicines, (b) diagnostic devices, such as a pulse oximeter, blood pressure sensor, or EKG sensor, (c) treatment devices, such as an EpiPen, a first aid kit, or various kinds of defibrillators (e.g., an automated external defibrillator (AED)), and/or (d) remote support devices, such as a mobile phone or a head-mountable device (HMD), among other possibilities. Note that some items that are electronic may include one or more batteries to provide power to the item. These batteries may be rechargeable and may be recharged using one or more wired or wireless charging systems. In addition or on in the alternative, an item may be integrated with one or more batteries in the power system 521 for power.

A UAV 500 may employ various systems and configurations in order to transport items to the scene of a medical situation. For example, as shown in FIG. 1, a UAV 100 can include a compartment 135, in which an item or items may be transported. As another example, the UAV can include a pick-and-place mechanism, which can pick up and hold the item while the UAV is in flight, and then release the item during or after the UAV's descent. As yet another example, a UAV could include an air-bag drop system, a parachute drop system, and/or a winch system that is operable from high above a medical situation to drop or lower an item or items to the scene of the medical situation. Other examples are also possible.

In some implementations, a given UAV 500 may include a "package" designed for a particular medical situation (or possibly for a particular set of medical situations). A package may include one or more items for medical support in the particular medical situation, and/or one or more medical-support modules 516 that are designed to provide medical support in the particular medical situation. In some cases, a UAV 500 may include a package that is designed for a particular medical situation such as choking, cardiac arrest, shock, asthma, drowning, etc.

In other cases, a UAV 500 may include a package that is designed for a number of different medical situations, which may be associated in some way. For example, a dive-accident package may be designed to provide or assist in provision of care in various medical situations that are often associated with a scuba diving accident, such as drowning and/or decompression sickness. Such a dive-accident package might include a flotation device, an oxygen-therapy system, a system for delivering visual and/or audible medical care instructions (e.g., instructions for performing CPR), and/or a signaling device, among other possibilities. A UAV 500 that is configured with such a dive-accident package may be referred to herein as a "dive-rescue" UAV. Such a dive-rescue UAV may be deployed to a diver on the surface of the water, who has just had an accident while scuba diving, with the hope that the UAV can reach the diver and deliver medical treatment sooner than would otherwise be possible.

For instance, provided with the above dive-accident package, the UAV 500 may drop a flotation device to help the diver stay afloat until the diver can be reached by rescuers. In addition, the UAV may include a signaling device, which can be automatically turned on when the UAV locates the diver. Doing so may help a rescue boat locate a diver more quickly. Further, once the diver has been rescued, the UAV may display visual instructions and/or play back auditory instructions for CPR, which may help to revive a drowning victim. Such instructions may be particularly useful in the case where the diver is rescued by non-medical professionals; if the diver is rescued by a passing fishing boat, for example.

Further, when the UAV arrives at the scene of a dive accident or, more likely, once the diver has been moved to a rescue boat, the UAV could provide an oxygen-therapy system, and possibly instructions for use thereof, in order to treat possible decompression sickness. Since a rescue boat might not have oxygen-therapy system, and immediate administration of pure oxygen has been shown to increase the probability of recovering from decompression sickness, such functionality of a UAV could improve treatment for a diver suffering from decompression sickness.

In some embodiments, a UAV 500 could include an integrated system or device for administering or assisting in the administration of medical care (e.g., a system or device having one or more components that are built in to the structure of the UAV itself). For example, as noted above, a UAV could include an oxygen-therapy system. In an example configuration, an oxygen-therapy system might include a mask that is connected via tubing to an on-board oxygen source. Configured as such, the UAV could release the oxygen mask when it reaches a person in need of oxygen (e.g., at a fire scene).

As another example of a UAV with an integrated medical-support device, a UAV 500 might function as a mobile defibrillator. Specifically, rather than carry a stand-alone defibrillator that can then be removed from the UAV for use, the UAV itself may function as a defibrillator.

As a specific example, a multicopter might include components of an AED that is built into its body, as well as retractable electrode pads for administering a shock to a person who is experiencing a cardiac event or arrest. When the multicopter arrives at the scene of cardiac arrest, the multicopter may land, disable its rotors, and enter a mode where it functions as an AED. Specifically, after landing, the multicopter may release its retractable electrode pads and provide instructions so that a bystander, who might be a layperson, could use the electrode pads to administer care to the person with a cardiac arrest. Such instructions may be provided, for example, by displaying text and/or video on a graphic display that is built in to the body of the multicopter, and/or by playing back audio instructions. The multicopter could also include a wireless communication interface via which a bystander could communicate with a live remote operator (e.g., a medical professional at a remote location), in order to receive instructions for using the AED Many other examples and variations on the above examples of UAVs with integrated medical-support systems and devices are also possible. For instance, a medical device may be integrated into the structure of a UAV itself when doing so reduces weight, improves aerodynamics, and/or simplifies the use of the device by a person at the scene of the medical situation. Further, those skilled in the art will appreciate that a medical-support system or device may be integrated in the structure of a UAV in other situations and for other reasons.

In some applications, a UAV 500 may be dispatched to the scene of a medical situation to provide early intelligence to medical personnel. In particular, a UAV 500 may be dispatched because it is expected to reach the location of a medical situation more rapidly than medical personnel are able to. In this scenario, the UAV 500 may arrive at the scene and provide early intelligence by communicating information and providing situational awareness to medical personnel. For example, a UAV 500 may use its imaging system(s) 508 to capture video and/or still images at the scene of the medical situation, which the UAV 500 may communicate to medical and/or emergency personnel. As another example, UAV 500 could administer preliminary tests to a person in need, or request that a bystander administer certain preliminary diagnostic tests and/or provide certain information. UAV 500 may then send such test results and/or such information provided by a bystander to medical and/or emergency personnel. A UAV 500 may provide other types of early-intelligence information as well.

By providing early intelligence to medical and/or emergency personnel, a UAV 500 may help the medical and/or emergency personnel to prepare to provide care, such that more effective care can be provided once the personnel arrive at the scene. For instance, a UAV 500 could send video, test results, and/or bystander-provided information to medical personnel while they are travelling in an ambulance on their way to the scene, to firemen or other personnel while they are in a fire truck on their way to the scene, and/or to police they are in a law-enforcement vehicle on their way to the scene, among other possibilities.

It should be understood that the examples of medical-support functionality that are provided herein are not intended to be limited. A UAV may be configured to provide other types of medical-support functionality without departing from the scope of the invention.

V. Illustrative Methods

Figure 6:
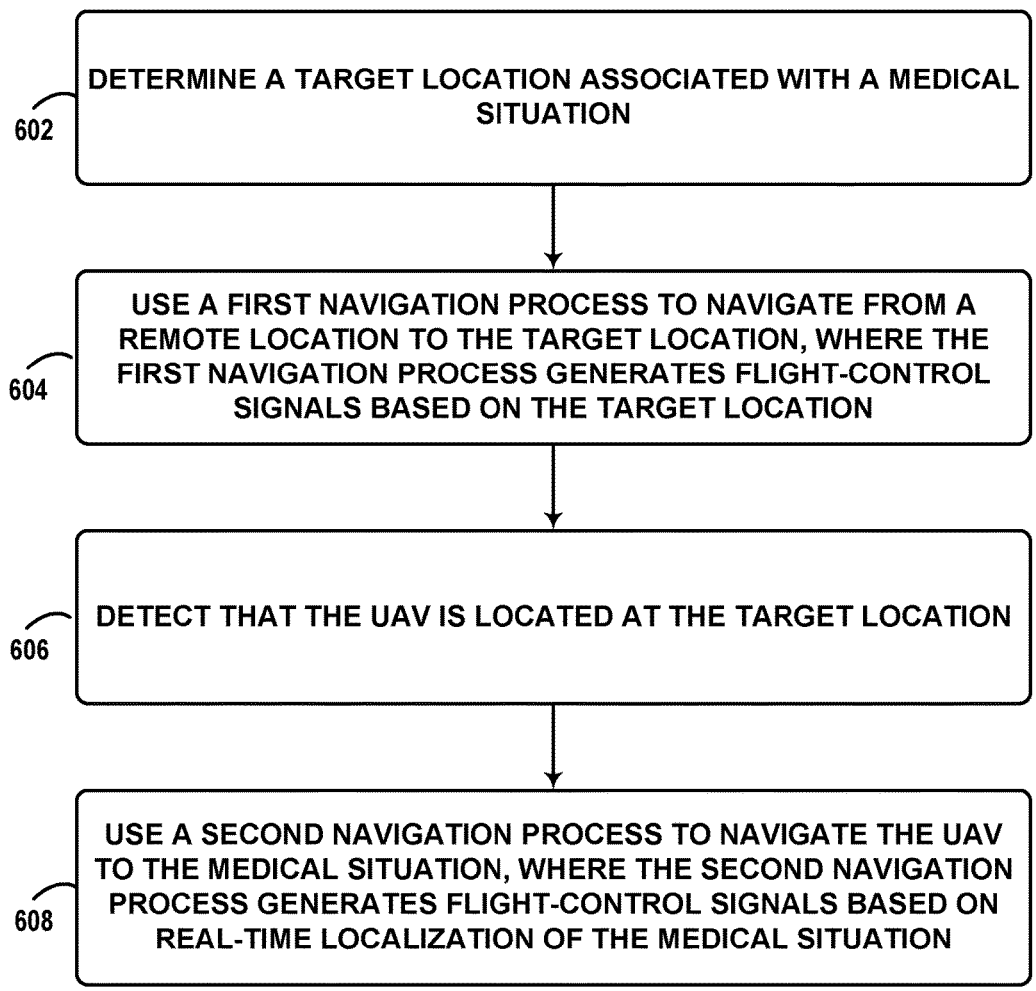
FIG. 6 is a flow chart illustrating a method, according to an example embodiment.

FIG. 6 is a flow chart illustrating a method 600, according to an example embodiment. Method 600 may be implemented by a UAV in order to navigate to an approximate target location associated with a medical situation using a first navigation process, and then switch to a second navigation process for real-time localization of, and navigation to, the medical situation. More specifically, the UAV may determine an approximate target location based on information that is known when the UAV is dispatched (e.g., the GPS coordinates of a device at the scene), then use the first navigation process to navigate to the approximate target location. Once the UAV arrives at the approximate target location, the UAV may switch to the second navigation process, which gathers local information at the scene and uses the local information for real-time localization of the medical situation.

Illustrative methods, such as method 600, may be implemented by a UAV, such as the UAVs described in reference to FIGS. 1 to 3, or by one or more components of such UAVs. For instance, an example method could be carried out by a navigation module and/or a control system of a UAV, or by a combined navigation and control system, among other possibilities. In other embodiments, some or all of an example method may be carried out by a remote computing device that is in communication with a UAV. For example, some or all of an exemplary method may be carried out by a medical-support system, such as by the one or more of the components of the medical-support system 400 shown in FIG. 4.

Referring to FIG. 6 in more detail, method 600 involves a UAV determining an approximate target location associated with a medical situation, as shown by block 602. The UAV may then use a first navigation process to navigate the UAV from a remote location to the approximate target location of the medical situation, where the first navigation process generates flight-control signals based on the approximate target location of a medical situation, as shown by block 604. Further, the UAV may detect when the UAV is located at the approximate target location of the medical situation, as shown by block 606. In response, the UAV may use a second navigation process to navigate the UAV to the medical situation, where the second navigation process generates flight-control signals based on real-time localization of the medical situation, as shown by block 608.

A. Determining the Approximate Target Location

As noted above, block 602 of method 600 involves a UAV determining an approximate target location that is associated with the identified medical situation. Various techniques may be used to determine the approximate target location.

Further, the approximate target location may take various forms. For example, the approximate target location could be provided in the form of GPS coordinates, at a certain latitude and longitude, a street address, and/or a certain place (e.g., a particular building, stadium, landmark, or park), among other possibilities.

In some embodiments, the approximate target location may be an estimated location of the person or persons who are likely to benefit from medical support in the given medical situation. For example, if a person who is need of medical care places an emergency call from their own mobile phone, the approximate target location may be determined to be or otherwise based on the location of their mobile phone. As another example, if a bystander places an emergency call from their mobile phone in order to report a medical situation that involves another person, it may be assumed or otherwise determined that the bystander is at or near the location of the other person. Accordingly, the approximate target location may be set to (or otherwise determined from) the location of the bystander's mobile phone.

In other embodiments, the approximate target location may be different from the location of the person or persons who are likely to benefit from medical support. For example, consider a scenario where an emergency medical technician (EMT) or paramedic is closer to the location of a person in need of medical support, but the EMT or paramedic does not have certain medical supplies that are needed for or might improve the medical care that can be provided. In this scenario, a medical support system may dispatch a UAV to the location of the EMT or paramedic in order to deliver medical supplies to the EMT or paramedic, so that they can take them with them to the scene of the medical situation. Further, in some cases, the UAV might even be configured to deliver the medical supplies to the EMT or paramedic as they travel to the scene of the medical situation. In such case, the approximate target location (e.g., the location of the EMT or paramedic) may be dynamically updated to reflect the movement of the EMT or paramedic as they travel to the scene.

In some embodiments, the target location may in fact be a location from a set of possible locations. For example, the target location may be any location within a certain distance from a particular location. As a specific example, the target location may be any location within 100 feet from the GPS coordinates provided by the remote device from which medical support was requested. As such, the target location may in fact be a target area (e.g., an area within a 100-foot radius from the location of the remote device).

Note that in an example embodiment, method 600 may be carried out entirely by a UAV. As such, the determination of the target location at block 602 may simply involve the UAV receiving a data message that indicates the target location, such as a message indicating the GPS coordinates of a remote device from which medical support was requested, for instance. As such, the logic to actively determine what the target location is for a given medical situation may be implemented at a component or component of a medical support system, such as an access system and/or a dispatch system.

In a further aspect, the target location may be determined based on a various types of location information. For instance, in some embodiments, the target location may be determined based on location information that is provided by the remote device from which the indication of the medical situation was received. For example, consider a scenario where a bystander calls "911" and says "Somebody near me just collapsed!" Typically, when receiving a phone call, the police also receive location information, such as GPS coordinates, which identify the location of the remote device. This location information may then be made available to a medical support system or otherwise accessible for purposes of determining the target location (e.g., via an E911 system). For example, when a remote device calls to report a medical situation, an operator at an access system or an automated dispatch system could determine the location of the remote device based on such received GPS coordinates.

A medical support system may determine and/or be provided with information that the can be used to determine the target location in other ways. For instance, in some embodiments, part or all of the process of determining the target location could be automated or, in other words, performed without a need for human intervention. To this end, the medical support system could utilize any suitable information-recognition technique, such as, for example, voice recognition (when the notification is spoken) or character recognition (when the notification is typed), among other techniques now known or later developed. As an example, consider a scenario where a bystander calls "911" and says: "Somebody near me just collapsed! I'm at 123 Main Street, Mountain View." In this situation, an automated dispatch system could apply speech-to-text processing to analyze the bystander's words and determine the stated address therefrom.

Other types of location information may also be utilized to determine the target location. For example, the medical support system may obtain location information from image data that is captured by a remote device at the scene of a medical situation, and sent from the remote device to a medical support system. For example, a notifier may use the camera of their mobile phone to capture and send video and/or still images to the medical support system, possibly in real-time. A component of a medical support system could then analyze such image data to detect, e.g., street signs and/or landmarks such as buildings or sculptures, which may help to identify the location of a medical situation.

The above techniques for determining the approximate target location associated with a medical situation are provided for illustrative purposes and not intended to be limiting. It should be understood that other techniques may be used to determine the approximate target location, without departing from the scope of the invention.

B. Using a First Navigation Process to Navigate to the Target Location

As noted above, method 600 involves a UAV using a first navigation process, in which flight-control signals based on the approximate target location of a medical situation, to navigate to the approximate target location. In particular, the approximate target location may be pre-determined, before the UAV is dispatched. Further, a route to the approximate target location may also be determined before the UAV is dispatched. A navigation module of the UAV (e.g., and autopilot system) may then generate flight-control commands according to the pre-determined route to the approximate target location. As an example, the first navigation process may involve navigating to GPS coordinates of a remote device at the scene of the medical situation via predetermined waypoints. Other examples are also possible.

C. Using a Second Navigation Process to Navigate to the Target Location

Block 606 and 608 of method 600 may involve a UAV detecting that it has reached an approximate target location, and responsively using a second navigation process to navigate the UAV to the medical situation. In particular, the UAV may switch to a navigation process in which flight-control signals are generated based on real-time localization of the medical situation.

At block 606, a UAV may use various techniques to determine that it is located at the approximate target location. For example, if the approximate target location is the GPS coordinates of the remote device from which the medical situation was reported, then a UAV 400 may use its GPS system 406 to determine when it has reached those GPS coordinates. Alternatively, the UAV may consider itself to have reached the approximate target location when it is within a certain distance from the GPS coordinates (e.g., within 100 feet).

As another example, if the approximate target location is a particular landmark (e.g., a particular building, a stadium, a park, or a certain beach), then a UAV 400 may utilize its GPS system 406 and/or another location-determination system in conjunction with mapping data to determine when the UAV is located at or near a location that the mapping data associates with the particular landmark. Such mapping data may be included in the data storage of a UAV, or may be provided to a UAV by a remote mapping server.

As noted above, the second navigation process may be based on a real-time localization process. As such, the second navigation process may involve dynamically updating the location information upon which flight-control signals are based, as the UAV is in the process of navigating to the medical situation. Thus, the second navigation process may differ from the first navigation process in which flight-control signals are based on a predetermined route to a predetermined approximate target location.

Further, at block 608, the second navigation process may be based on various types of real-time localization processes. For example, the real-time localization process may be (a) a beacon-sensing localization process, (b) an environment-sensing localization process, or (c) a localization process that combines beacon-sensing with environment-sensing. Other types of localization processes are also possible.

i. Flight Control Based on Environment-Sensing Localization

An environment-sensing localization process may involve a UAV using data from its various sensors and/or data captured by a remote device at the scene of the medical situation to analyze its environment and/or the environment at the medical situation, in order to help navigate to the medical situation. For instance, a UAV 400 may use imaging system(s) 408 to capture image data of its environment, and/or may use microphone(s) to capture audio data from its environment. Such image data may then be analyzed to detect person(s) or object(s) associated with the medical situation.

As a specific example of environment-sensing localization, a UAV could detect a face of person associated with the medical situation, such as the person in need of medical support and/or a bystander who called to report the medical situation or is otherwise determined to be at the scene of the medical situation. As another example, a UAV could detect a characteristic item of clothing (e.g., a red shirt) being worn by a person that is believed to be at the scene of the medical situation. As yet another example, a UAV could analyze audio captured by its microphone for certain words that are expected to be spoken by a person at the scene of the accident. Other examples are also possible.

Further, when a UAV detects an associated person or object in image data, the UAV may determine the direction of the person from the UAV and generate flight-control signals to navigate towards the person. As the UAV navigates to the person or object, the UAV may continue to analyze image data, update the direction of the person or object that is used to generate flight-control signals. As such, the flight-control signals are based on location information (e.g., the direction of the person or object) that is dynamically updated during flight.

ii. Flight Control Based on Beacon-Sensing Localization

At block 608, the second navigation process may be based on various types of beacon-sensing localization. Generally, a beacon-sensing localization process may involve a UAV locating the source of a beacon signal, so that the UAV can navigate to the source. For example, beacon-sensing localization may involve the UAV searching for various types of directional signals that can be emitted by a remote device at the scene of a medical situation. Such directional signals may include, but are not limited to: (a) an RF beacon, which could be transmitted under various protocols, such as Bluetooth, an RFID protocol such as NFC, or another RF communication protocol, (b) an acoustic beacon (e.g., a certain sound or pattern of sounds), or (c) a visual beacon (e.g., a certain frequency of light and/or a certain flashing pattern).

Further, to facilitate localization by a UAV, a remote device may transmit a directional beacon such that the signal strength in a particular direction is stronger than in other directions. As such, a UAV can determine the general direction of the remote device and navigate to the remote device by "sourcing" the directional signals; e.g., by determining where the signal is strongest and navigating accordingly.

In some embodiments, the heat emitted by a person's body at or near the scene of a medical situation may serve as a beacon signal, which a UAV may utilize for localization. For instance, a UV may include an infrared or thermographic camera that allows it to capture thermographic image data of the environment. The thermographic image data may be analyzed to detect "heat signatures" of a people in the environment, from which the UAV may be able to determine information such as the person's size, position, and/or what type of clothes the person is wearing. Further, a UAV might include a directional microwave antenna that could be directed at people for whom heat signatures are detected, in order to learn, e.g., the heart beat of that person. In such an embodiment, localization might involve a process of locating a person whose heart has stopped beating (and possibly why is lying on the ground), and then navigating to them so that medical support can be provided. In an example, embodiment, the source of the beacon signal may be a remote device that is associated with the medical situation, such as (a) a mobile phone, (b) a tablet computer, or (c) a laptop computer, among other possibilities.

The source of a beacon signal could also be another UAV that was previously dispatched to the scene of the medical situation. For example, a medical support system may dispatch a first and second UAV to the scene of a medical situation. The first UAV may be comparatively smaller and/or lighter than the second UAV, but may be capable of quickly locating and flying to the scene of a medical situation. The second UAV may be comparatively larger and/or heavier, may be able to provide medical-support functionality that the first UAV cannot provide, but may not be able to reach the medical situation as quickly as the first UAV. Therefore, to assist the second UAV in locating and navigating to the medical situation, the first UAV may transmit a beacon signal once it arrives at the medical situation. Additionally or alternatively, once the first UAV arrives at the medical situation, the first UAV could send other data to the second UAV, such as images or video captured at the scene. Other sources of a beacon signal are also possible.

In some embodiments, a UAV may implement a device-identification and/or authorization function in conjunction with beacon-sensing localization. Specifically, identification data that uniquely identifies the particular medical situation, such as a unique security key or code, may be included in a beacon signal. The authorization function may thus be used to determine whether the beacon signal is being emitted by a remote device that is associated with the medical situation. This may help in a scenario where there multiple beacon signals are detected, and the UAV needs to identify which beacon signal indicates the location of the particular medical situation to which the UAV has been dispatched.

Figure 7:
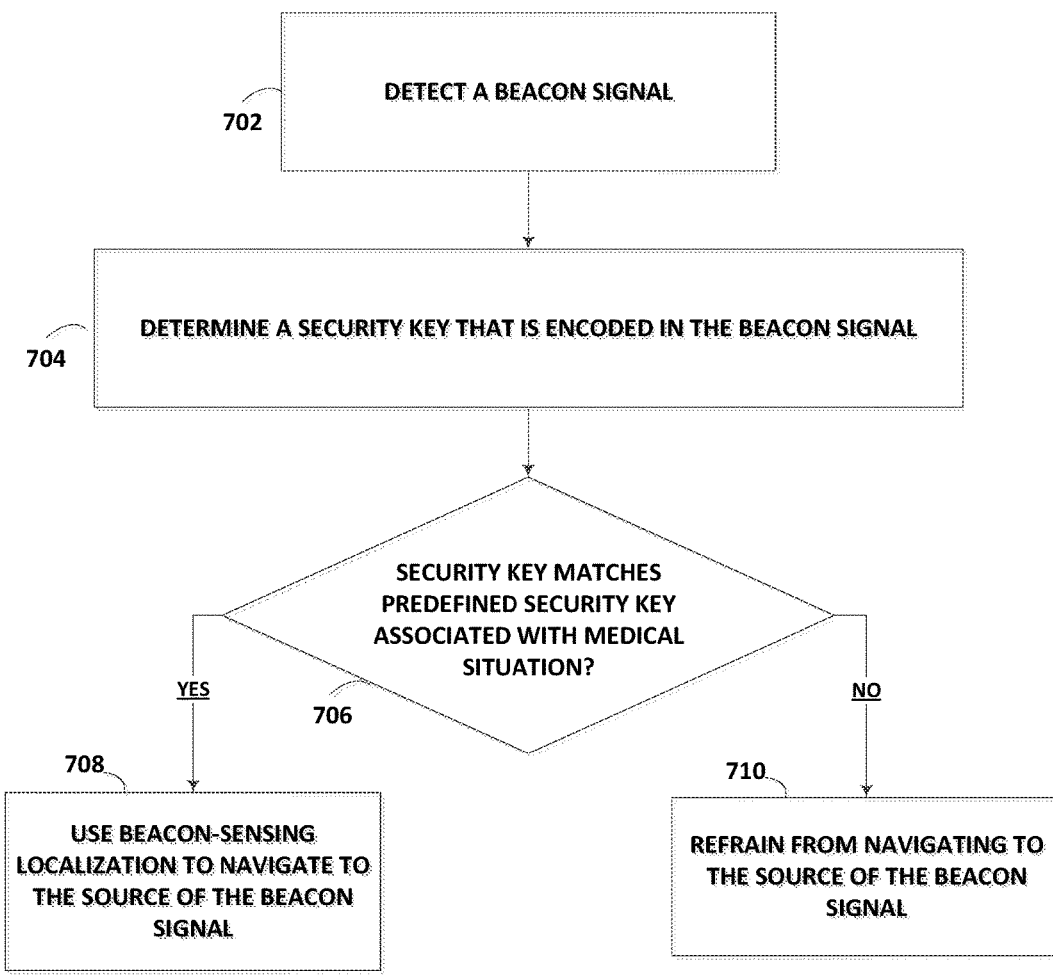
FIG. 7 is a flow chart illustrating a beacon-sensing localization method with an integrated identification function, according to an example embodiment.

For example, FIG. 7 is a flow chart illustrating a beacon-sensing localization method 700 with an integrated identification function, according to an example embodiment. In particular, method 700 involves a UAV detecting a beacon signal, as shown by block 702. The UAV may then determine a security key that is encoded in the beacon signal, as shown by block 704. Further, the UAV may determine whether or not the security key matches a predefined security key for the medical situation, as shown by block 706.

In a further aspect, the UAV may condition navigation to the source of the beacon signal upon the security key matching a predefined security key for the medical situation. Specifically, if the security key matches the predefined security key, the UAV may proceed to use beacon-sensing localization to navigate to the source of the beacon signal, as shown by block 708. If the security key does not match the predefined security key, then the UAV may refrain from navigating to the source of the beacon signal, and may take other actions instead, as shown by block 710. For instance, the UAV might search for another beacon signal with a matching security key, and, if none can be found, then alert the medical support system that the medical situation has not been located and/or return to the location of its deployment system, among other possibilities.

In an embodiment where a security key is utilized, the medical support system may generate and send the security key to the remote device at the scene of the medical situation. For instance, when a remote device is used to request medical support, an access system or a dispatch system may generate a unique security key, associate the unique security key with the medical situation, and send the security key to the remote device so that it can be included in the beacon signal.

A security key may be generated using various techniques. For instance, the medical support system could use a random security key generator or implement a hashing function that generates a security key based on a unique device identification number of a remote device, among other possible techniques.

In some embodiments, the second navigation process may incorporate use of two or more different types of localization. For example, the second navigation process may generate flight controls according to dynamically-updated location information provided by the combination of environment-sensing localization and/or beacon-sensing localization. Other combinations are also possible.

iii. Intelligent Localization with Fallback Process

In some embodiments, an example method may provide a fallback process, in the event that autonomous localization processes, such as environment-sensing localization and/or beacon-sensing localization, fail to locate the medical situation. More specifically, autonomous localization may be desirable since it allows the UAV to locate and navigate to a medical situation without human intervention. For various reasons, however, there may be scenarios where a UAV cannot locate a medical situation using autonomous localization. In such scenarios, a UAV may implement a fallback process to allow for human assistance in locating and/or navigating to the medical location.

Figure 8:
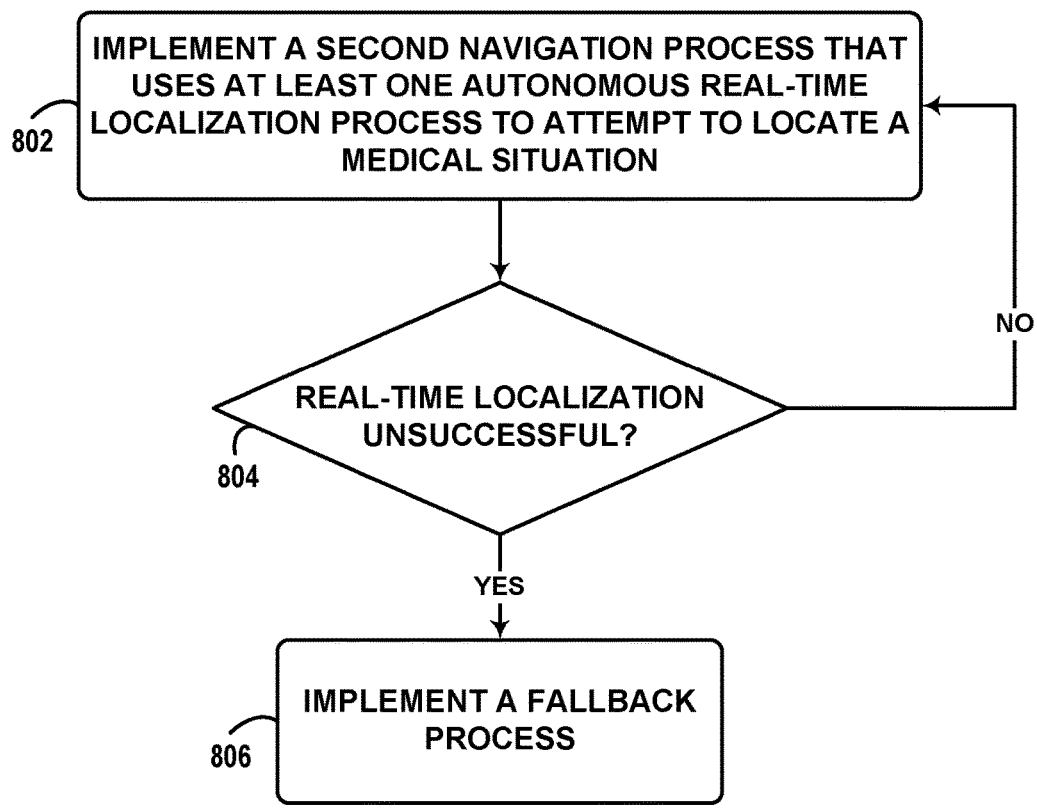
FIG. 8 is a flow chart illustrating a fallback method, according to an example embodiment.

For example, FIG. 8 is a flow chart illustrating a fallback method 800, according to an example embodiment. In particular, a UAV may implement a second navigation process in which the UAV uses at least one autonomous real-time localization process to attempt to locate the medical situation, as shown by block 802. At block 804, the UAV may determine whether or not real-time localization should be considered unsuccessful. For example, real-time localization may be considered to be unsuccessful, if a certain period of time has elapsed without locating the medical situation, and/or if the UAV has covered a certain geographic area without locating the medical situation (e.g., an area within a 200-foot radius of the GPS coordinates of the remote device that requested medical support). In the event that the real-time localization process is deemed to be unsuccessful, the UAV may implement a fallback process, as shown by block 806.

In some embodiments, the fallback process may involve the UAV switching to a remote-control mode that allows for at least partial control of the UAV by a remote operator. For example, while operating in a remote-control mode, a UAV may receive flight-control instructions that are sent to the UAV by a remote operator. As such, the UAV may send a message to the medical support system indicating that the UAV needs assistance in locating the medical situation, so that a remote operator knows that remote control is possible and/or desired.

In such a remote-control mode, the UAV may communicate wirelessly with a remote operator. For example, the UAV may send image data and/or other sensor data to the computing device being used by the remote operator. Such data may help the remote operator to see and locate the medical situation, and/or may assist the remote operator in controlling the flight of the UAV. Further, the UAV may receive flight-control instructions based on input from the remote operator.

In some embodiments, the fallback process may involve the UAV implementing a process to seek out local assistance. Such a process may involve the UAV obtaining assistance from a person near the UAV (who may or may not be at or near the medical situation) to manually transport the UAV to the medical situation.

For example, when a UAV reaches the approximate target location, and implements the second navigation process but fails to autonomously locate to the medical situation, the UAV may request that a person near the approximate target location assist the UAV by, for example, providing additional information as to where the medical situation is. For instance, a UAV might play out an audio message stating: "we have been notified of a heart attack in this area; if possible, please tell me which direction this situation is from here." The UAV might then listen for and analyze speech for useful information. For example, if someone yells "over here!" then the UAV may determine the direction of the voice and head towards it. As another example, a UAV may seek local assistance in actually carrying the UAV to the scene of the medical situation. Other examples are also possible.

In some embodiments, the fallback process might not allow a remote operator to assist the UAV in locating the medical situation, without necessarily taking over full control of the UAV. For example, the fallback process could provide a mechanism via which a remote operator could "unstick" an attempt at autonomous localization that seems to be failing. For example, the remote operator could provide additional location information to the UAV, e.g., by marking the exact location of the medical situation on an image or map. As another example, the remote operator could review video or other sensor data and based on their analysis, indicate a general direction of the medical situation. The UAV could then use such information for localization, in the hope that such additional information from the remote operator may allow the UAV to successfully navigate to the medical situation.

iv. Illustrative Application of a Two-Part Navigation Process

Figure 9:
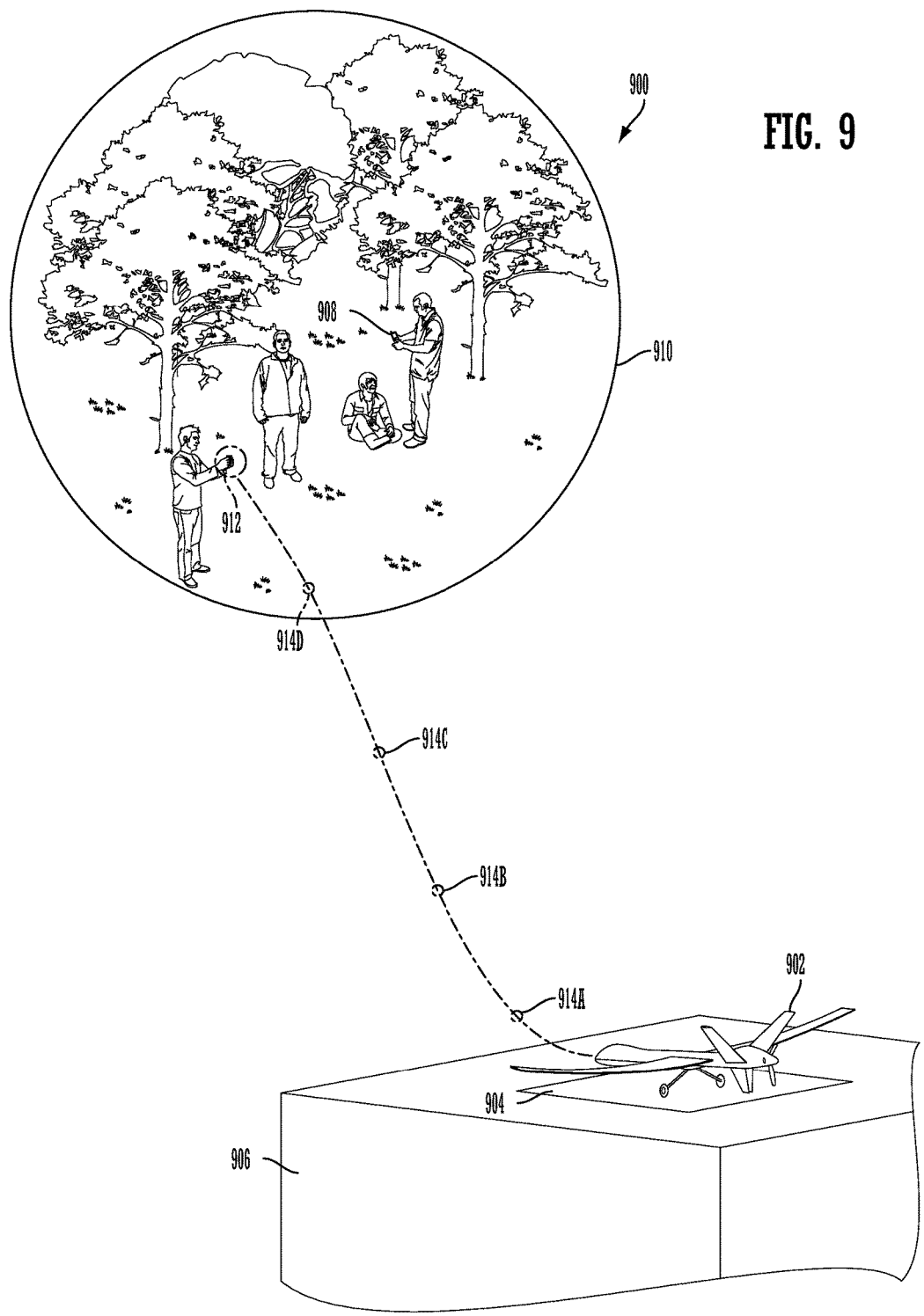
FIG. 9 is an illustration of a scenario in which example methods could be implemented.

FIG. 9 is an illustration of a scenario 900 in which example methods, such as methods 600, 700, and/or 800 could be implemented. As shown in scenario 900, a UAV 902 may be located at a deployment system 904, which may be on top of a firehouse 906. Further, UAV 902 may include a navigation module that provides both a first and a second navigation process to generate flight-control signals for UAV 902. The UAV 902 may implement the first navigation process to generate flight-control signals based on a predetermined location of a medical situation (e.g., the approximate target location), and may implement the second navigation process to generate flight-control signals based on a real-time localization process.

In scenario 900, a medical support system may receive a request from a user of a mobile phone 908 to provide medical support at a medical situation occurring in a park 910. When the request is received, the medical support system may obtain GPS coordinates indicating a location 912 of the mobile phone 908. Note that in scenario 900, the mobile phone 908 is located at the scene of the medical situation. However, due to an inaccuracy of GPS, the location 912 of the mobile phone indicated by the GPS coordinates may not be the exact location of the mobile phone (and of the medical situation). Thus, as shown in scenario 900, location 912 is some distance from the medical situation (e.g., 50 feet away).

When the medical support system receives the request for medical support, the medical support system may provide the GPS coordinates received from the mobile phone 908 to the UAV 902. Accordingly, UAV 902 may set location 912 to be the approximate target location and use the first navigation process to navigate to the approximate target location 912. In particular, before being launched, the UAV 902 may pre-determine a series of waypoints 914A to 914D, which provide a route to the approximate target location. Then, when UAV 902 is launched by deployment system 904, the UAV may generate flight-control commands so as to navigate along a route through waypoints 914A to 914D to get to the approximate target location 912.

When UAV 902 arrives at the approximate target location 912, UAV 902 may switch to use of the second navigation process to locate and navigate to the specific location of medical situation. For example, when UAV 902 determines that it has reached the approximate target location 912, UAV 902 may begin to scan for a beacon signal from mobile phone 908. While scanning, UAV 902 may remain substantially stationary at approximate target location 912, or may move in a methodical manner so as to increase the area where it can scan (e.g., by starting at the approximate target location 912 and moving outward in a spiral pattern around the approximate target location 912). When UAV 912 detects the beacon it may implement a sourcing technique to locate and navigate to the source of the beacon (i.e., the mobile phone 908).

Note that while approximate target location 912 is some distance from the medical situation in scenario 900, it is possible that the approximate target location is in fact accurate, and thus indicates the exact location of the medical situation. In such a scenario, a two-part navigation process such as described above may still be useful. Specifically, if the approximate target location is at the scene of the medical situation, the second navigation process may confirm this for the UAV, even if it does not result in the UAV actually needing to move from the approximate target location. For example, if a UAV reaches the approximate target location and switches to navigation based on beacon-sensing localization, determining that the beacon signal is, e.g., less than a foot away may indicate to the UAV that it has reached the medical situation itself, and thus can begin providing medical support. Other examples are also possible.

Further, it should be understood that the above is but one of many possible applications of an example method. Other applications are also possible.

In another embodiment, a UAV may be configured to switch to the second navigation process, in the event that it receives sufficient local information for localization before reaching the approximate target location. Accordingly, in a variation on method 600, block 606 could involve a UAV either making a determination that it is located at the determined approximate target location of the medical situation or, alternatively receiving local target-location data that is usable to navigate to the medical situation. Thus, block 608 could alternatively be performed in response to receipt of such local target-location data, if such data is received prior to reaching the approximate target location. For example, if a UAV detects a beacon signal or identifies the medical situation in image data from its environment, before reaching the approximate target location, it may switch to the second navigation process in order to navigate to the specific location of the medical situation. Other examples are also possible.

VI. Conclusion

Where example embodiments involve information related to a person or a device of a person, the embodiments should be understood to include privacy controls. Such privacy controls include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. An unmanned aerial vehicle (UAV) comprising:
   a non-transitory computer readable medium; and
   a control system comprising at least one processor, wherein the at least one processor is operable to execute program instructions stored on the non-transitory computer readable medium to:
   determine an approximate target area associated with a target;
   use a first navigation process to navigate the UAV from a first location to the approximate target location of the target, wherein the target is located at a ground location within the approximate target area, wherein the first navigation process generates first flight-control signals for the UAV based on a predetermined location of the target;
   make a determination that the UAV is located at the approximate target area;
   in response to the determination that the UAV is located at the approximate target area, switch to use of a second navigation process to locate, and navigate the UAV to, a position hovering above the ground location of the target, wherein the second navigation process generates second flight-control signals for the UAV using a real-time localization process that is based at least in part on real-time sensor data generated by one or more sensors on the UAV; and
   determine that the UAV is positioned above the ground location of the target and responsively, while hovering above the ground location, operate a winch system to lower a payload from the UAV to the ground location of the target.

2. The UAV of claim 1, wherein the approximate target area corresponds to a geographic location of a remote device, wherein the remote device is associated with the target.

3. The UAV of claim 1, wherein the first navigation process generates the first flight-control commands based on predetermined waypoints that provide a route to the approximate target area.

4. The UAV of claim 1, wherein the real-time localization process comprises at least one of: (a) an environment-sensing localization process and (b) a beacon-sensing localization process.

5. The UAV of claim 1, wherein the real-time localization process comprises a beacon-sensing localization process to locate and navigate to a source of a beacon signal, wherein the source is a remote device that is associated with the target.

6. The UAV of claim 5, wherein the beacon-sensing localization process comprises:
   detecting the beacon signal;
   determining a security key that is encoded in the beacon signal; and
   determining whether or not the security key matches a predefined security key for the target, wherein navigation to the source of the beacon signal is conditioned upon the security key matching a predefined security key for the target.

7. The UAV of claim 6, wherein the predefined security key was generated and sent to the remote device in response to a request for medical support made by the remote device.

8. A method comprising:
   determining, by a computing system of a unmanned aerial vehicle (UAV), an approximate target area associated with a target, wherein the target is located at ground location within the approximate target area, and wherein the computing system comprises at least one processor;
   using, by the computing system, a first navigation process to navigate the UAV from a first location to the approximate target area of the target, wherein the first navigation process generates first flight-control signals based on the approximate target area of the target;
   making, by the computing system, a determination that the UAV is located at the approximate target area;
   in response to the determination that the UAV is located at the approximate target area, using, by the computing system, a second navigation process to navigate the UAV to a position hovering above the ground location of the target, wherein the second navigation process generates second flight-control signals using a real-time localization process based at least in part on real-time sensor data generated by one or more sensors on the UAV; and
   determining, by the computing system, that the UAV is positioned above the ground location of the target and responsively operating a winch system to lower a payload from the UAV to the ground location of the target.

9. The method of claim 8, wherein the real-time localization process comprises at least one of: (a) an environment-sensing localization process and (b) a beacon-sensing localization process.

10. The method of claim 9, wherein the real-time localization process comprises a beacon-sensing localization process for locating and navigating to a source of a beacon signal, wherein the beacon-sensing localization process comprises:
    detecting the beacon signal;
    determining a security key that is encoded in the beacon signal; and
    determining whether or not the security key matches a predefined security key for the target, wherein navigation to the source of the beacon signal is conditioned upon the security key matching a predefined security key for the target.

11. The method of claim 8, wherein the second navigation process comprises:
    using an autonomous real-time localization process in an effort to locate the target;

when a predetermined period of time has elapsed after initiating the real-time localization process without locating the target, then:
  determining that the autonomous real-time localization is unsuccessful; and
  responsively implementing a fallback process to locate and navigate to the target; and
when the predetermined period of time after initiating the real-time localization process has not elapsed, then continuing to use the autonomous real-time localization process in an effort to locate the target.

12. The method of claim 11, wherein the fallback process comprises at least one of: (a) causing the UAV to switch to a remote-control mode where the UAV is controllable by a remote computing system and (b) causing the UAV to switch to a local-assistance mode where the UAV seeks local assistance.

13. A non-transitory computer readable medium having stored therein instructions that are executable by at least one processor to cause a computing to perform functions comprising:
  determining an approximate target area associated with a target, wherein the target is located at a ground location within the approximate target area;
  using a first navigation process to navigate an unmanned aerial vehicle (UAV) from a first location to the approximate target area of the target, wherein the first navigation process generates first flight-control signals based on the approximate target area of the target;
  making a determination that the UAV is located at the approximate target area;
  in response to the determination that the UAV is located at the approximate target area, using a second navigation process to navigate the UAV to a position hovering over the ground location of the target, wherein the second navigation process generates second flight-control signals using a real-time localization based on real-time sensor data generated by one or more sensors on the UAV; and
  determining that the UAV is positioned over the target and responsively operating a winch system to lower a payload from the UAV to the target.

14. The non-transitory computer readable medium of claim 13, wherein the real-time localization process comprises at least one of: (a) an environment-sensing localization process and (b) a beacon-sensing localization process.

15. The non-transitory computer readable medium of claim 14, wherein the real-time localization process comprises a beacon-sensing localization process for locating and navigating to a source of a beacon signal, wherein the beacon-sensing localization process comprises:
  detecting the beacon signal;
  determining a security key that is encoded in the beacon signal; and
  determining whether or not the security key matches a predefined security key for the target, wherein navigation to the source of the beacon signal is conditioned upon the security key matching a predefined security key for the target.

16. The non-transitory computer readable medium of claim 13, wherein the second navigation process comprises:
  using an autonomous real-time localization process in an effort to locate the target;
  when a predetermined period of time has elapsed after initiating the real-time localization process without locating the target, then:
    determining that the autonomous real-time localization is unsuccessful; and
    responsively implementing a fallback process to locate and navigate to the target; and
  when the predetermined period of time after initiating the real-time localization process has not elapsed, then continuing to use the autonomous real-time localization process in an effort to locate the target.

17. The non-transitory computer readable medium of claim 16, wherein the fallback process comprises at least one of: (a) causing the UAV to switch to a remote-control mode in which the UAV is controllable by a remote computing system and (b) causing the UAV to switch to a local-assistance mode in which the UAV seeks local assistance.

18. The non-transitory computer readable medium of claim 13, wherein the second navigation process comprises:
  using an autonomous real-time localization process in an effort to locate the target, wherein the UAV moves through a search area while using the autonomous real-time localization process, and wherein the search area is determined based on the approximate target location;
  when the UAV has covered the entire search area without locating the target, then:
    determining that the autonomous real-time localization is unsuccessful; and
    responsively implementing a fallback process to locate and navigate to the target; and
  when the UAV has not covered the entire search area without locating the target, then using an autonomous real-time localization process in an effort to locate the target.

19. A method comprising: determining, by a computing system of an unmanned aerial vehicle (UAV), an approximate target area associated with a target, wherein the target is located at ground location within the approximate target area;
  using, by the computing system, a first navigation process to navigate the UAV from a first location to the approximate target area, wherein the first navigation process generates first flight-control signals based on the approximate target area;
  either: (a) making a determination, by the computing system, that the UAV is located at the approximate target area or (b) receiving, by the computing system, local target-location data that is usable to navigate to a position over the ground location of the target;
  in response to either (a) or (b), using, by the computing system, a second navigation process to navigate the UAV to a position hovering over the ground location of the target, wherein the second navigation process generates second flight-control signals using a real-time localization of the target based at least in part on real-time sensor data generated by one or more sensors on the UAV; and
  determining that the UAV is positioned over to the ground location of the target and responsively operate a winch system to lower a payload from the UAV to the to the ground location of target.

20. The method of claim 19, wherein the real-time localization comprises using the local target-location data to generate the second flight-control signals to navigate to the to the ground location of target.

* * * * *